(12) United States Patent
Matsuda et al.

(10) Patent No.: US 11,102,705 B2
(45) Date of Patent: Aug. 24, 2021

(54) COMMUNICATION DEVICE, COMMUNICATION METHOD, AND PROGRAM

(71) Applicant: Sony Corporation, Tokyo (JP)

(72) Inventors: Hiroki Matsuda, Tokyo (JP); Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,267

(22) PCT Filed: Jul. 26, 2017

(86) PCT No.: PCT/JP2017/027101
§ 371 (c)(1),
(2) Date: Sep. 30, 2019

(87) PCT Pub. No.: WO2018/030158
PCT Pub. Date: Feb. 15, 2018

(65) Prior Publication Data
US 2020/0029270 A1    Jan. 23, 2020

(30) Foreign Application Priority Data

Aug. 9, 2016  (JP) .............................. JP2016-156435

(51) Int. Cl.
*H04W 48/10* (2009.01)
*H04J 99/00* (2009.01)
(Continued)

(52) U.S. Cl.
CPC ............. *H04W 48/10* (2013.01); *H04J 15/00* (2013.01); *H04W 72/02* (2013.01); *H04B 1/69* (2013.01); *H04L 1/0071* (2013.01); *H04W 52/50* (2013.01)

(58) Field of Classification Search
CPC ................................ H04W 48/10; H04J 15/00
(Continued)

(56) References Cited

U.S. PATENT DOCUMENTS

2011/0134872 A1* 6/2011 Nakao ................... H04L 5/0053
370/329
2014/0126509 A1* 5/2014 You ....................... H04B 7/0697
370/329
(Continued)

FOREIGN PATENT DOCUMENTS

| JP | 2015-198351 A | 11/2015 |
|---|---|---|
| JP | 2015-216704 A | 12/2015 |
| WO | 2016/002060 A1 | 1/2016 |

OTHER PUBLICATIONS

ZTE, "WF on Scenarios for Multiple Access", 3GPP TSG-RAN WG1#85 R1-165595, Nanjing China May 23-27, 2016, 5 Pages.
(Continued)

*Primary Examiner* — Peter G Solinsky
(74) *Attorney, Agent, or Firm* — Xsensus LLP

(57) ABSTRACT

[Object] To provide a communication device capable of efficiently using a NOMA technology by effectively sharing information to be used in NOMA.

[Solution] Provided is a communication device including: a setting unit configured to set a predetermined resource pool to be used for transmission and information regarding non-orthogonal multiplexing in a first device; and a transmission processing unit configured to broadcast the information regarding the non-orthogonal multiplexing.

26 Claims, 28 Drawing Sheets

(51) Int. Cl.
  *H04W 72/02* (2009.01)
  *H04B 1/69* (2011.01)
  *H04L 1/00* (2006.01)
  *H04W 52/50* (2009.01)

(58) Field of Classification Search
  USPC .......................................................... 370/329
  See application file for complete search history.

(56) References Cited

U.S. PATENT DOCUMENTS

| | | | | |
|---|---|---|---|---|
| 2015/0264668 | A1* | 9/2015 | Takehana | H04L 5/0032 370/329 |
| 2015/0382327 | A1* | 12/2015 | Kishiyama | H04L 27/2601 370/329 |
| 2018/0219590 | A1* | 8/2018 | Matsuda | H04L 27/183 |
| 2018/0375551 | A1* | 12/2018 | Song | H04W 74/02 |
| 2020/0204238 | A1* | 6/2020 | Na | H04B 7/0626 |
| 2020/0305187 | A1* | 9/2020 | Takeda | H04W 74/006 |

OTHER PUBLICATIONS

Sony, "Consideration on the Non-Orthogonal Multiple Access for NR", 3GPP TSG RAN WG1 #85 R1-164656 Nanjing China, May 23-27, 2016, 4 Pages.
Sony, "Non-Orthogonal Multiple Access for uplink", 3GPP TSG RAN WG1 #86 R1-166651 Gotheburg Sweden Aug. 22-26, 2016, 5 Pages.
Saito et al., "Non-Orthogonal Multiple Access (NOMA) for Future Radio Access", Vehicular Technology Conference (VTC Spring), 77th IEEE, Jun. 2013, 5 pages.
International Search Report dated Oct. 17, 2017 for PCT/JP2017/027101 filed on Jul. 26, 2017, 9 pages including English translation.
Samsung Electronics: "Discussions of Grant-Free Multiple Access in CIoT (Update of GPC150512)", ~ 3GPP Draft; Jun. 29, 2015-Jul. 2, 20150 Jun. 29, 2015 (Jun. 29, 2015), XP051625652.
ZTE: "Uplink Multi-user Transmission for Massive MTC", 3GPP Draft; RP-152208; Dec. 7, 2015-Dec. 10, 2015 Dec. 8, 2015 (Dec. 8, 2015), XP051656535.
Extended European Search Report dated Jun. 24, 2019, issued in corresponding European Patent Application No. 17839231.2.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

# COMMUNICATION DEVICE, COMMUNICATION METHOD, AND PROGRAM

CROSS-REFERENCE TO RELATED APPLICATIONS

The present application is based on PCT filing PCT/JP2017/027101, filed 26 Jul. 2017, and claims priority to 2016-156435, filed in the Japanese Patent Office on 9 Aug. 2016, the entire contents of each of which being incorporated herein by reference.

TECHNICAL FIELD

The present disclosure relates to a communication device, a communication method, and a program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE NR is an access technology capable of handling various use cases including Enhanced Mobile broadband (eMBB), Massive Machine Type Communications (mMTC), and ultra, reliable and Low Latency Communications (URLLC). NR is reviewed for the purpose of a technology framework corresponding to use scenarios, request conditions, placement scenarios, and the like in such use cases. In NR, a new improvement in frequency use efficiency is requested due to reasons such as a countermeasure for about 20 of multiples a maximum data rate and a countermeasure for simultaneous communication of about 10 multiples of the number of terminals compared to LTE. As one of the technologies for improving the frequency use efficiency, a non-orthogonal multiple access (NOMA) technology has been noticed. The details of the NOMA technology are disclosed in Non-Patent Literature 1.

CITATION LIST

Non-Patent Literature

Non-Patent Literature 1: Yuya Saito, Yoshihisa Kishiyama, Anass Benjebbour, Takehiro Nakamura, Anxin Li, and Kenichi Higuchi, "Non-Orthogonal Multiple Access (NOMA) for Future Radio Access," Vehicular Technology Conference (VTC Spring), 2013 IEEE 77th, pp. 1 to 5, June 2013.

DISCLOSURE OF INVENTION

Technical Problem

NOMA is a technology for increase resources to improve frequency use efficiency by adding non-orthogonal axes such as an interleave pattern axis, a spreading pattern axis, a scrambling pattern axis, a codebook axis, and a power axis to a frequency axis and a time axis, and use of the technology in NR is expected. In the NOMA technology, it is necessary to perform a process such as a cancellation process or maximum likelihood determination for signal decoding in a reception device while enabling a plurality of signals to be multiplexed at the same frequency and with time resources. Therefore, in the NOMA technology, it is important to examine efficient means such as resource allocation and a decision method for signaling or multiple signals.

Accordingly, the present disclosure proposes a novel and improved communication device, communication method, and program capable of efficiently using a NOMA technology by effectively sharing information to be used in NOMA.

Solution to Problem

According to the present disclosure, there is provided a communication device including: a setting unit configured to set a predetermined resource pool to be used for transmission and information regarding non-orthogonal multiplexing in a first device; and a transmission processing unit configured to broadcast the information regarding the non-orthogonal multiplexing.

In addition, according to the present disclosure, there is provided a communication device including: a reception processing unit configured to receive broadcasted information regarding non-orthogonal multiplexing from a first device; and a transmission processing unit configured to transmit a signal subjected to the non-orthogonal multiplexing on same frequency and time resources using the information regarding the non-orthogonal multiplexing to the first device. The transmission processing unit transmits the information regarding the non-orthogonal multiplexing to the first device, In addition, according to the present disclosure, there is provided a communication method including: setting a predetermined resource pool to be used for transmission and information regarding non-orthogonal multiplexing in a first device; and broadcasting the information regarding the non-orthogonal multiplexing.

In addition, according to the present disclosure, there is provided a communication method including: receiving broadcasted information regarding non-orthogonal multiplexing from a first device; transmitting a signal subjected to the non-orthogonal multiplexing on same frequency and time resources using the information regarding the non-orthogonal multiplexing to the first device; and transmitting the information regarding the non-orthogonal multiplexing to the first device.

In addition, according to the present disclosure, there is provided a computer program causing a computer to: set a predetermined resource pool to be used for transmission and information regarding non-orthogonal multiplexing in a first device; and broadcast the information regarding the non-orthogonal multiplexing.

In addition, according to the present disclosure, there is provided a computer program causing a computer to: receive broadcasted information regarding non-orthogonal multiplexing from a first device; transmit a signal subjected to the non-multiplexing on same frequency and time resources using the information regarding the non-orthogonal multiplexing to the first device; and transmit the information regarding the non-orthogonal multiplexing to the first device.

Advantageous Effects of Invention

According to the present disclosure, as described above, it is possible to provide a novel and improved communication device, communication method, and program capable of efficiently using a NOMA technology by effectively sharing information to be used in NOMA.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR

MODE(S) FOR CARRYING OUT INVENTION

Figure 1:
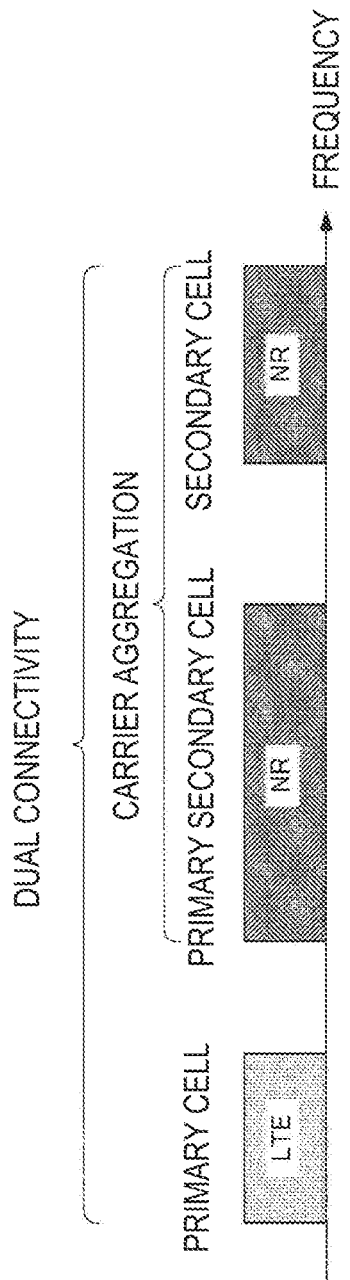
FIG. 1 is a diagram illustrating an example of setting of a component carrier according to a present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, technologies, functions, methods, configurations, and procedures to be described below and all other descriptions can be applied to LTE and NR unless particularly stated otherwise.

Note that the description will be made in the following order.
1. Embodiment of the present disclosure
2. Application examples
3. Conclusion

1. EMBODIMENT OF THE PRESENT DISCLOSURE

<Wireless Communication System in the Present Embodiment>

In the present embodiment, a wireless communication system includes at least a base station device 1 and a terminal device 2 The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LW and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LW cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance, FIG. 1 is a diagram illustrating an example of setting of a component carrier according to the present embodiment. In the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
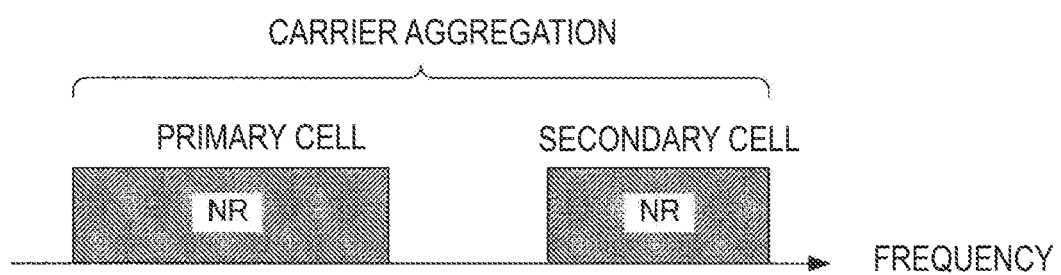
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LW cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special subframe, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame, The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
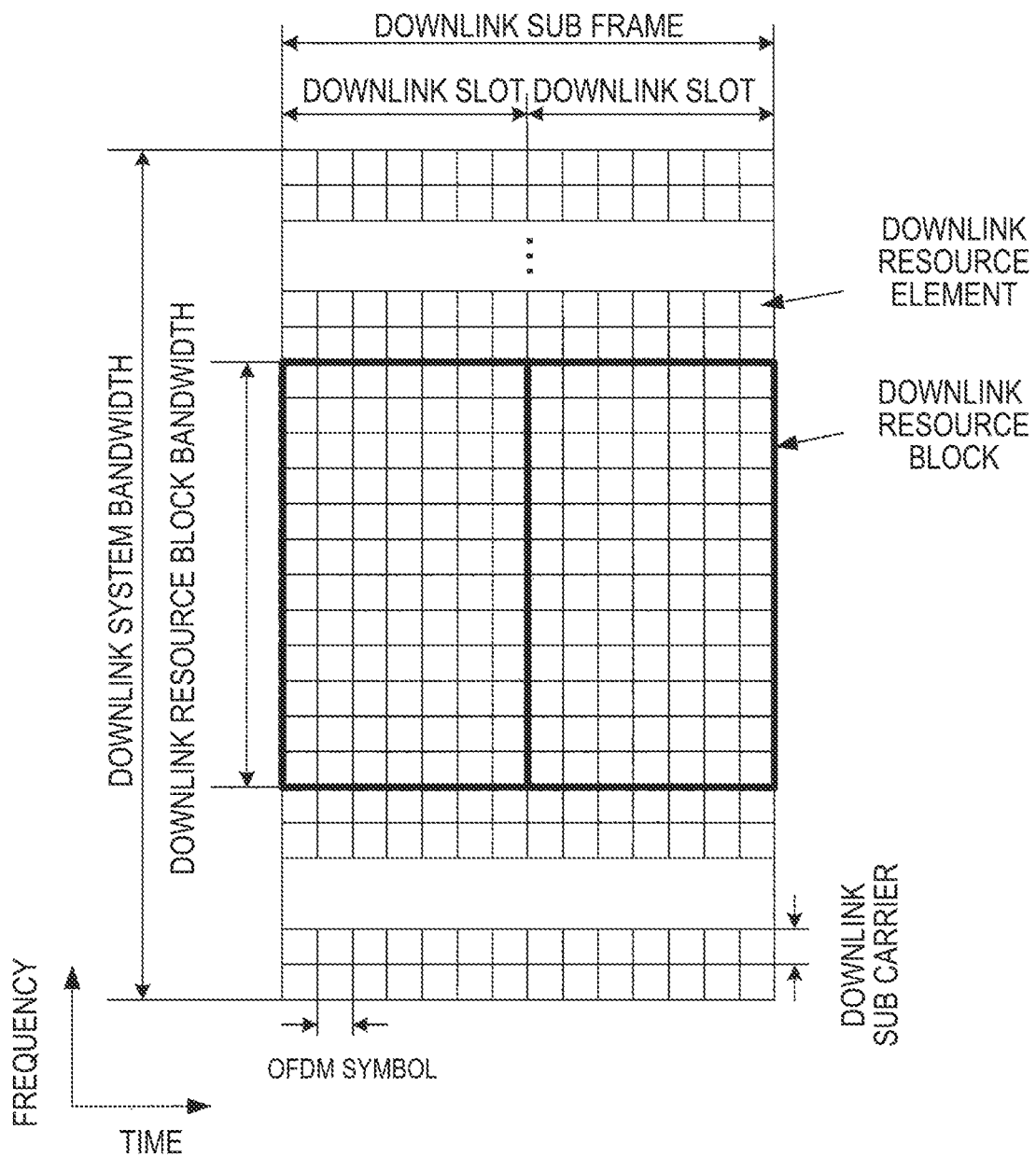
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
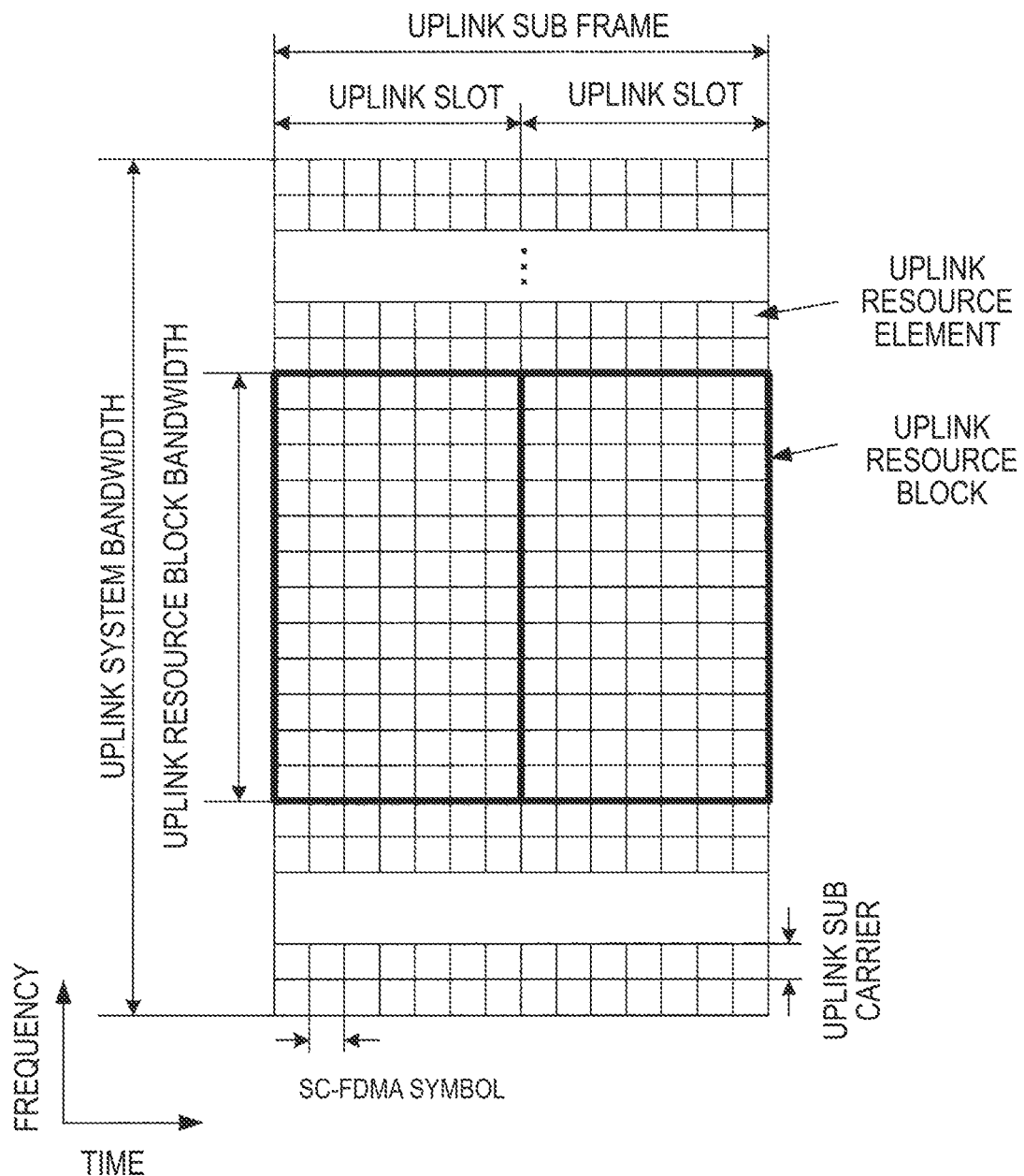
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to as simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per slab frame, and a CP length type. The CP length type is a type of CP length used in the NR cell. For example, CP length type 1 is equivalent to a normal CP in LTE and. CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
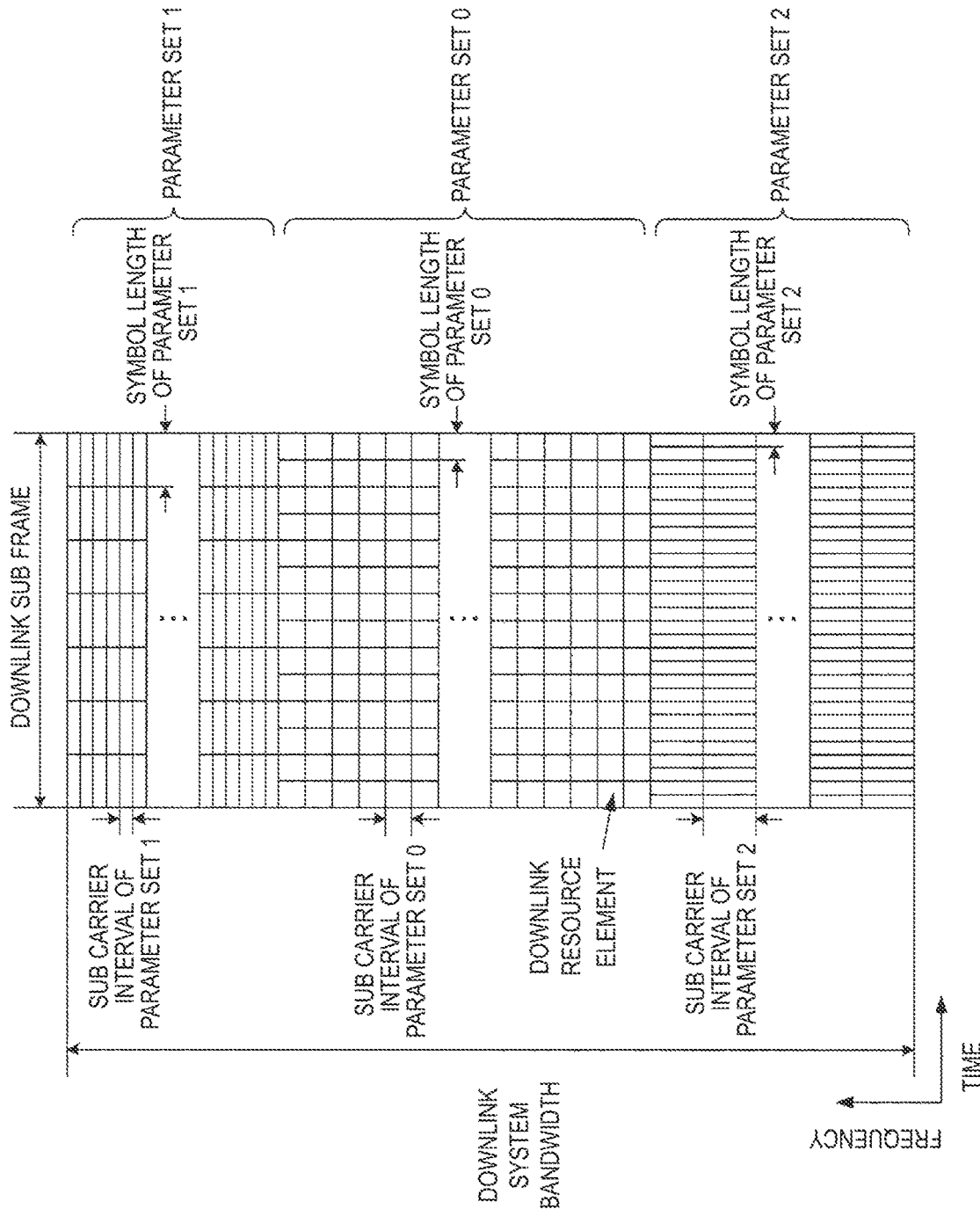
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
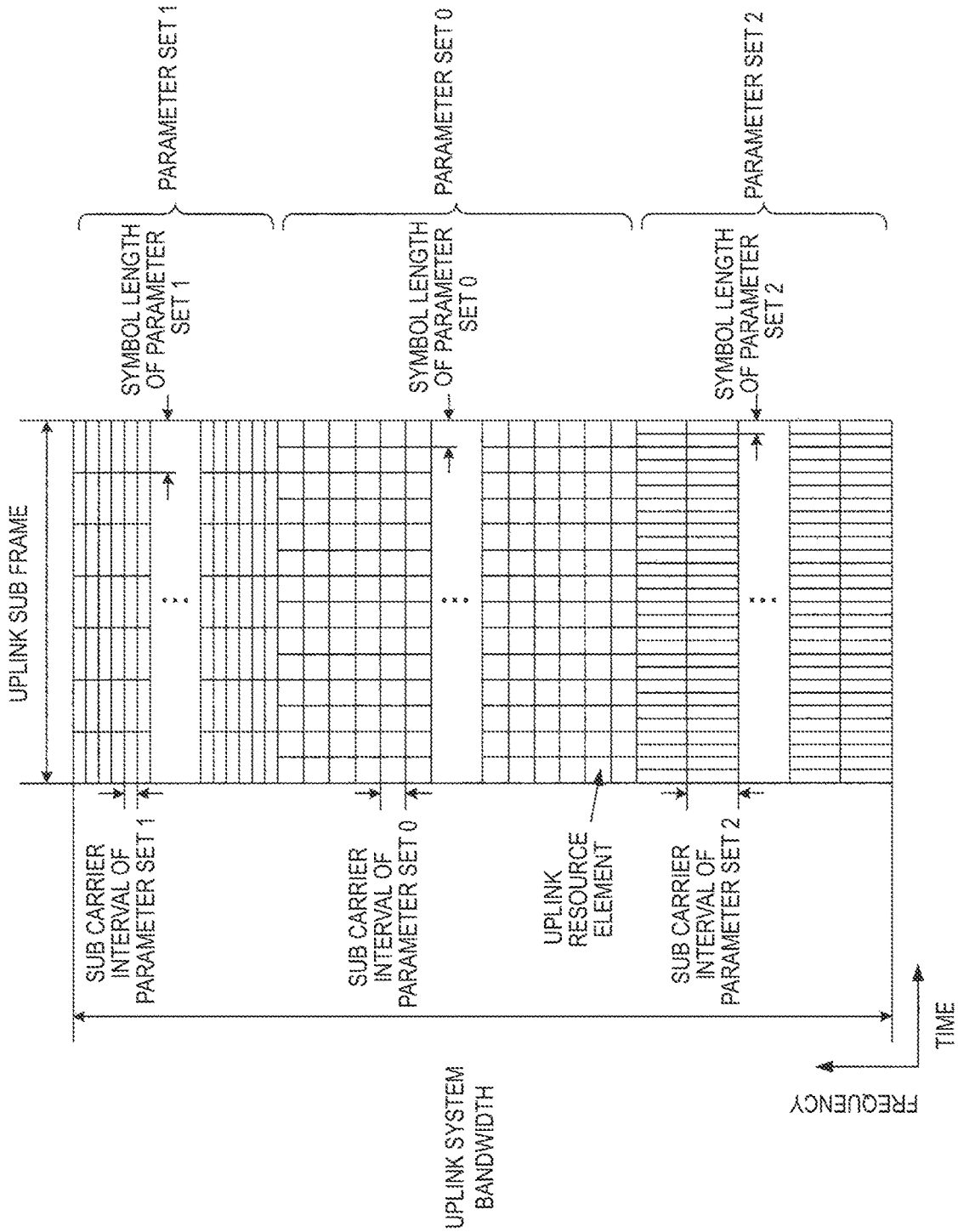
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATS. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SEN.

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the terminal device 2 receives the HARQ-ACK indicating ACK, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection, in other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS may be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Configuration Example of Base Station Device 1 in Present Embodiment>

Figure 8:
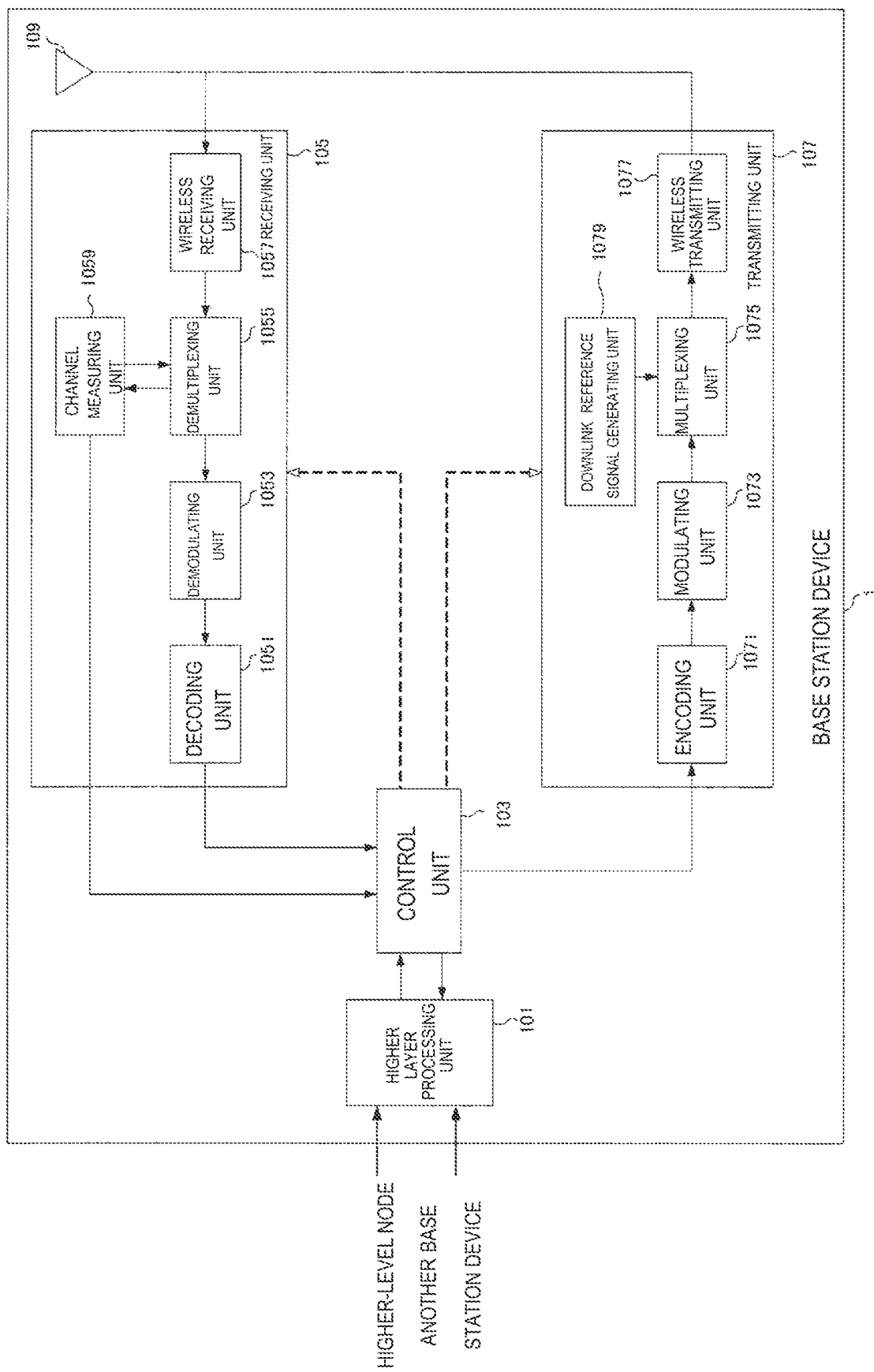
FIG. 8 is a schematic block diagram illustrating a configuration of a base station device of the present embodiment.

FIG. 8 is a schematic block diagram illustrating a configuration of the base station device 1 of the present embodiment. As illustrated, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more HATS. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUSCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Base Station Device 2 in Present Embodiment>

Figure 9:
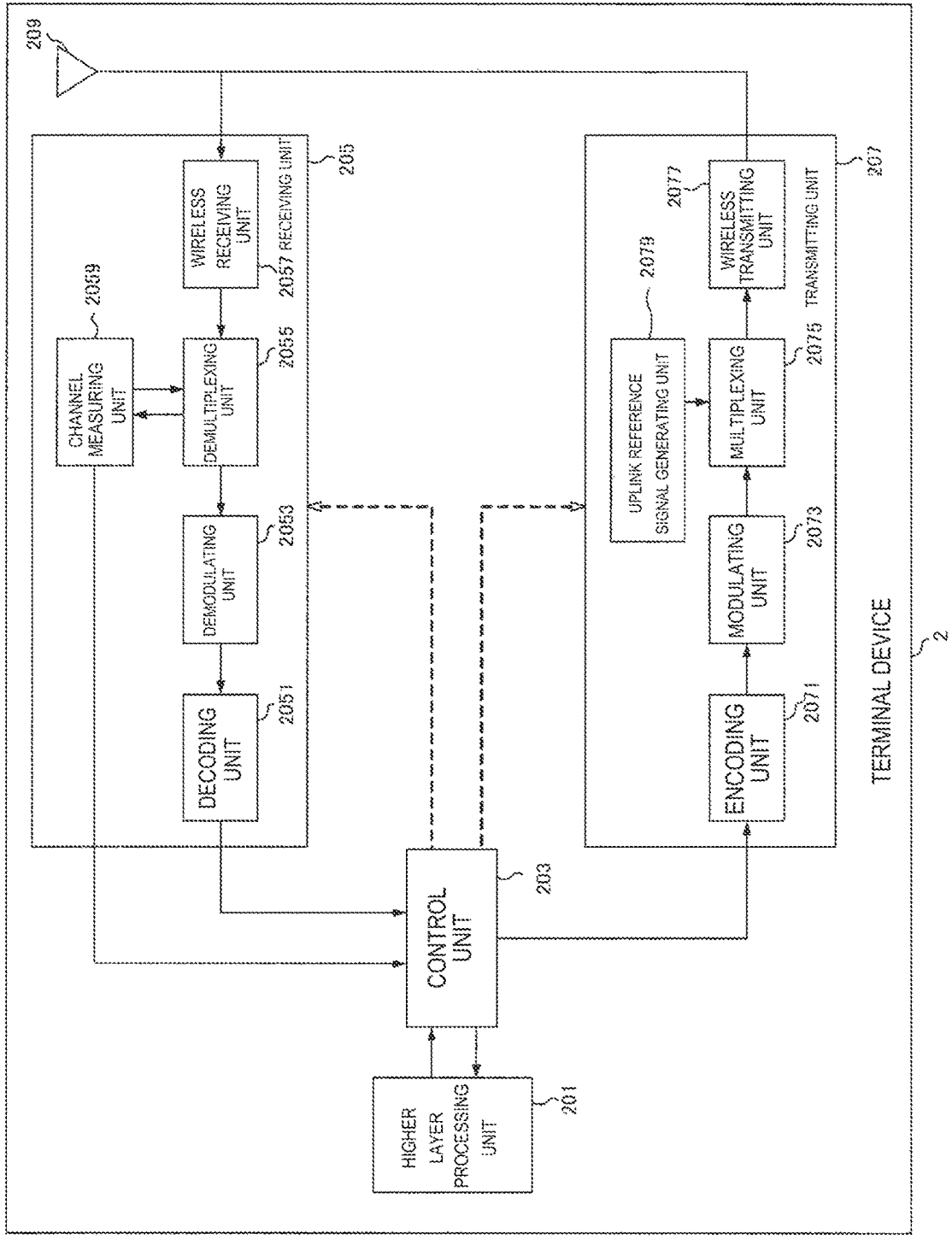
FIG. 9 is a schematic block diagram illustrating a configuration of a terminal device of the present embodiment.

FIG. 9 is a schematic block diagram illustrating a configuration of the terminal device 2 of the present embodiment. As illustrated, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (tinting) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may he decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PDCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-INTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2, monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N-1. For example, in a case in which the number of EREGs used in one ECCE is 4, the EPDCCH set constituted by 4 RB pairs constitutes 16 ECCEs.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an SI-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUCCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PDCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK. (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Figure 10:
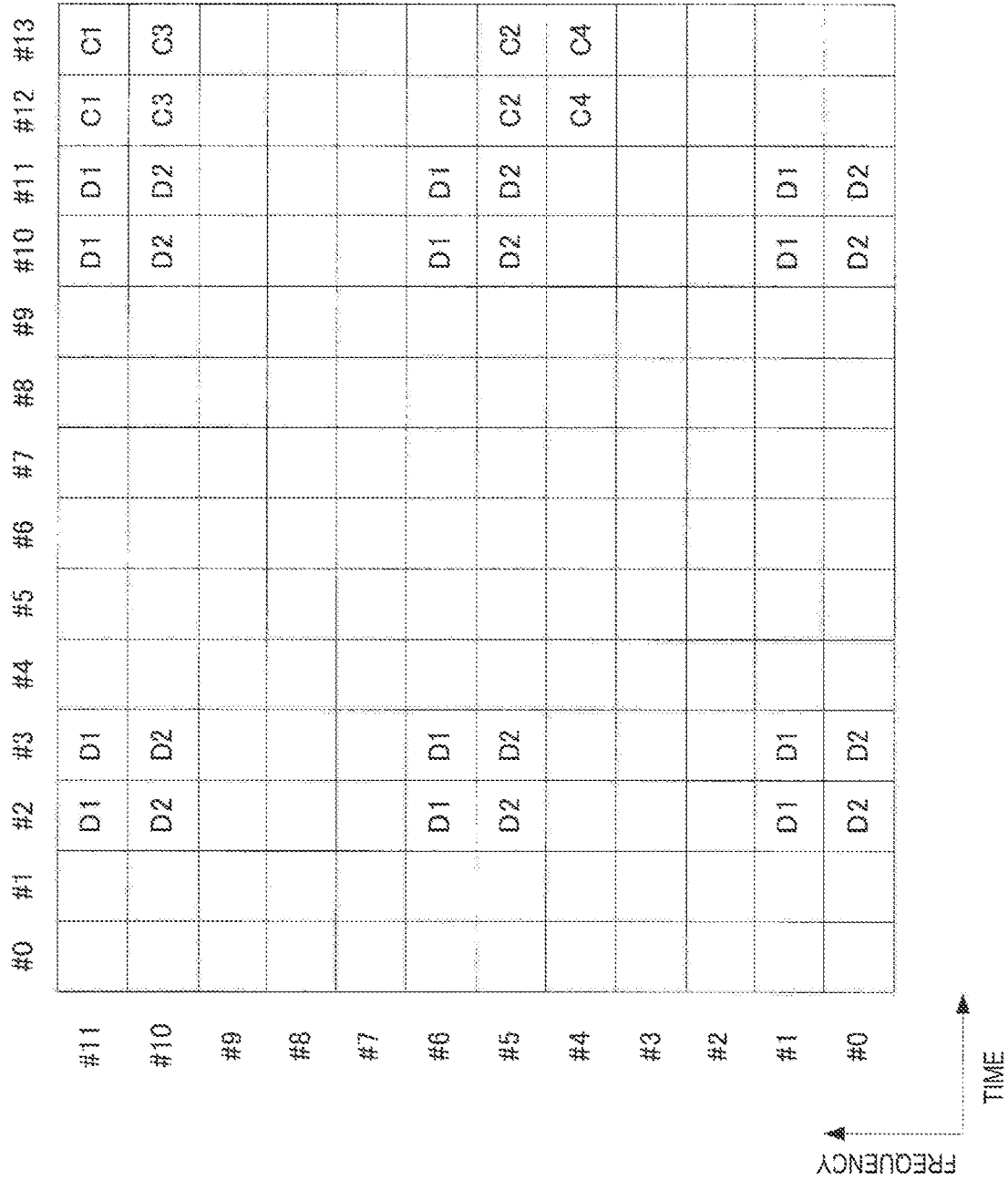
FIG. 10 is a diagram illustrating an example of downlink resource element mapping of NR according to the present embodiment.

FIG. 10 is a diagram illustrating an example of the downlink resource element mapping of NR according to the present embodiment. FIG. 10 illustrates a set of resource elements in the predetermined resources in a case in which parameter set 0 is used. The predetermined resources illustrated in FIG. 10 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCFI, a unit in which mapping of the predetermined channel or the predetermined signal to a resource element is defined, or a unit in which the parameter set is set.

In the example of FIG. 10, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and 172 indicate DL-DMRS of CDM group 1 and CDM group 2, respectively.

Figure 11:
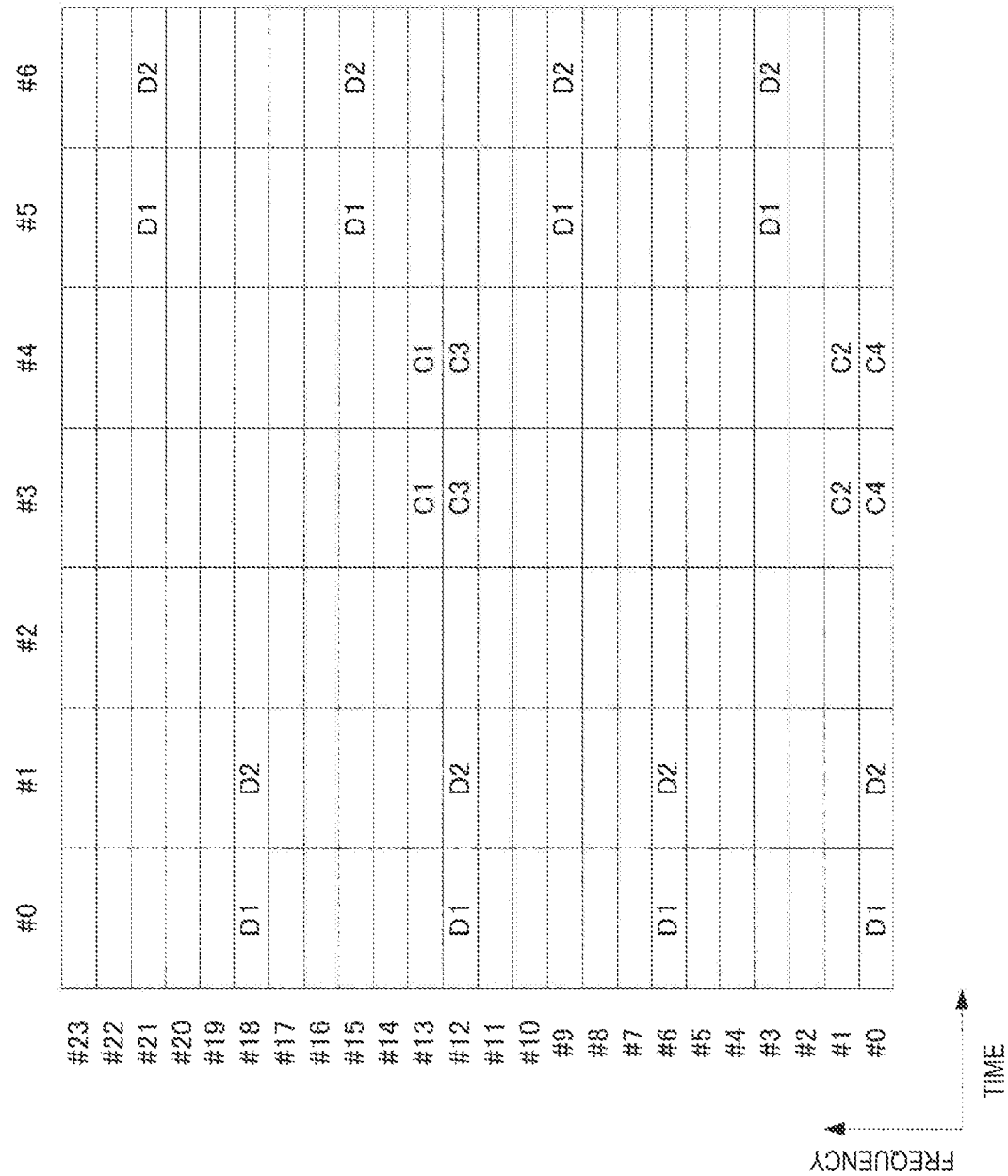
FIG. 11 is a diagram illustrating an example of downlink resource element mapping of NR according to the present embodiment.

FIG. 11 is a diagram illustrating an example of the downlink resource element mapping of NR according to the present embodiment. FIG. 11 illustrates a set of resource elements in the predetermined resources in a case in which parameter set 1 is used. The predetermined resources illustrated in FIG. 11 are resources formed by the same time length and frequency bandwidth as one resource block pair in LTE.

In the example of FIG. 11, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth, Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
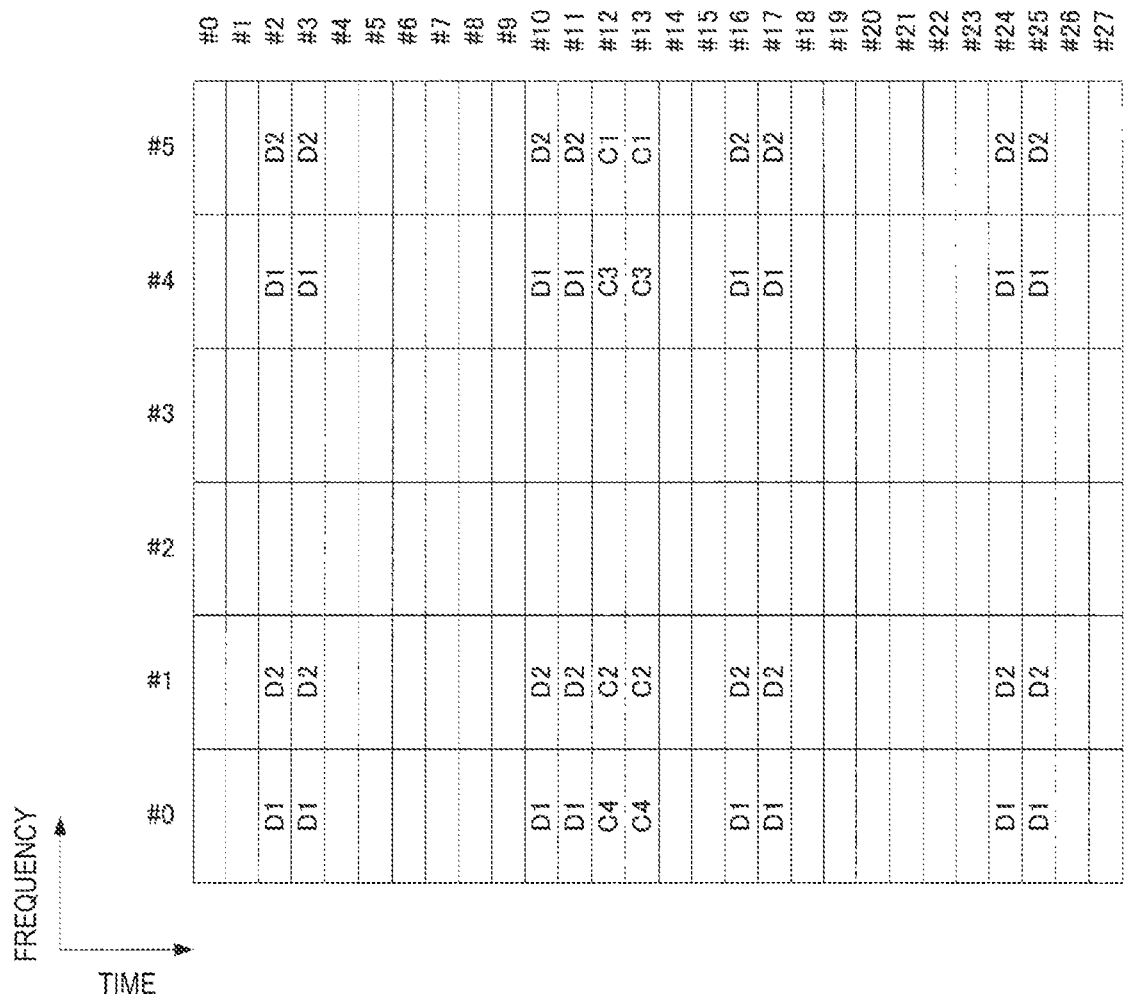
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Frame Configuration of NR in Present Embodiment>

Figure 13:
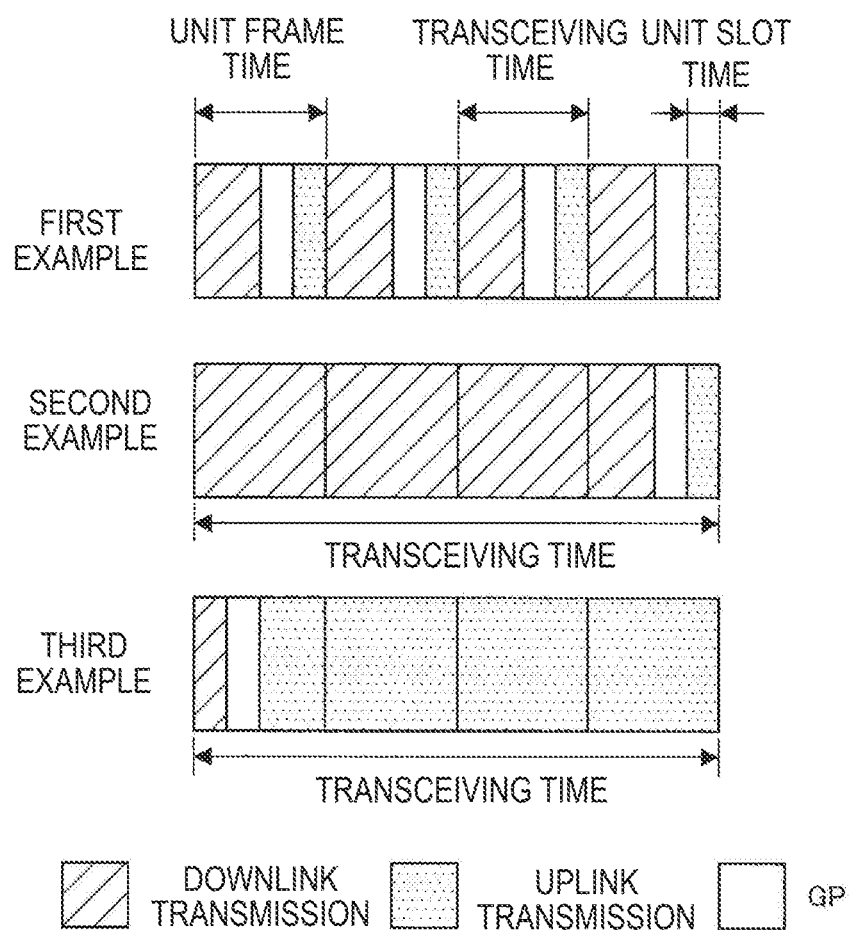
FIG. 13 is a diagram illustrating an example of a frame configuration of self-contained transmission according to the present embodiment.

In NR, a physical channel and/or a physical signal can be transmitted by self-contained transmission. FIG. 13 illustrates an example of a frame configuration of the self-contained transmission in the present embodiment. In the self-contained transmission, single transceiving includes successive downlink transmission, a GP, and successive downlink transmission from the head in that order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, downlink communication with low delay can be realized.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 may not average the CSI measurement between different transceiving. The transceiving time may be referred to as TTI. One transceiving time is defined as, for example, an integer multiple of the sampling interval (TA the symbol length, the unit slot time, or the unit frame time of NR.

<Non-Orthogonal Multiple Access (NOMA)>

In orthogonal multiple access (OMA), for example, transmission and reception are performed using a frequency axis and a time axis orthogonal to each other. At this time, as illustrated in FIG. 6, a frame configuration of frequency and time resources at a sub carrier interval is decided and resources equal to or greater than the number of resource elements may not be used.

On the other hand, in NOMA, non-orthogonal axes, for example, an interleave pattern axis, a spreading pattern axis, a scrambling pattern axis, a codebook axis, and a power axis, are added in addition to a frequency axis and a time axis orthogonal to each other to decide a frame configuration.

Figure 14:
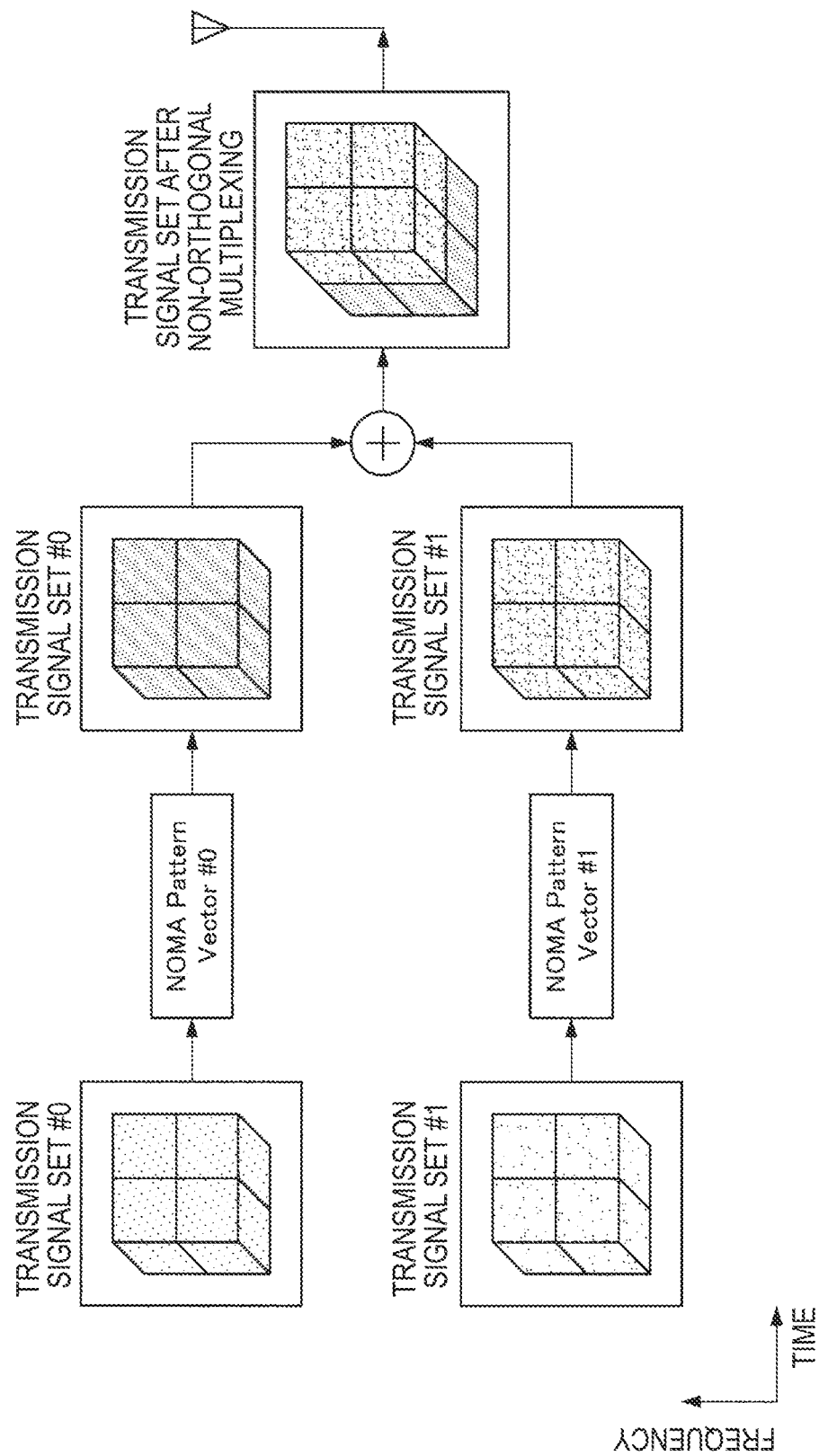
FIG. 14 is an explanatory diagram illustrating an example of a NOMA transmission process.
Figure 15:
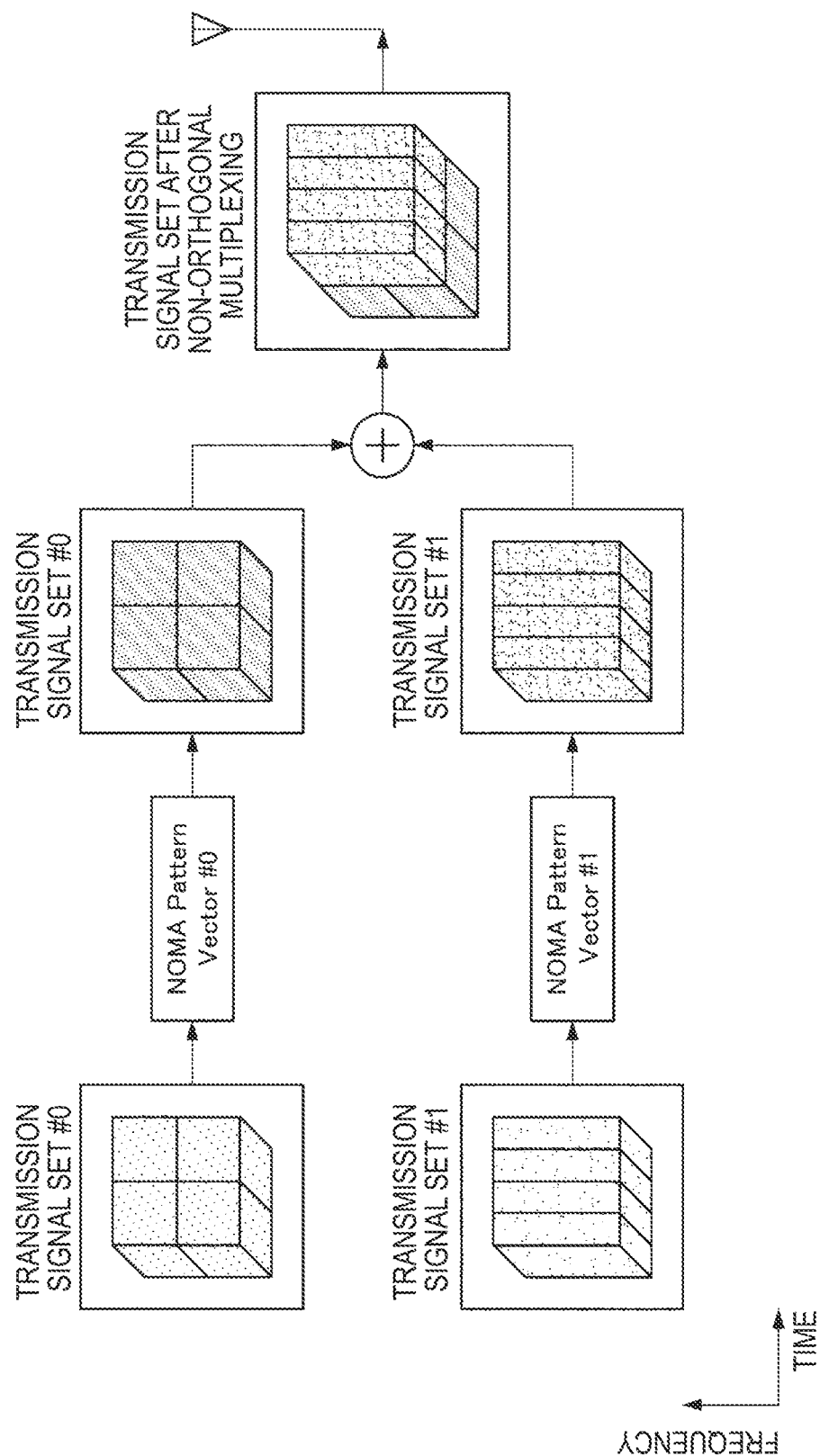
FIG. 15 is an explanatory diagram illustrating an example of a NOMA transmission process.

FIG. 14 is an explanatory diagram illustrating an example of a NOMA transmission process. For example, FIG. 14 illustrates a case of a parameter set in which transmission signals are multiplexed on non-orthogonal axes in a transmission device and all the resources multiplexed on the non-orthogonal axes are the same. Here, the transmission device is one of the base station device 1 and the terminal device 2. The transmission device prepares for a plurality of transmission signal sets to be multiplexed. In FIG. 14, two transmission signal sets are assumed to be multiplexed. Two transmission signal sets are used here, but three or more transmission signal sets may be used. In addition, each transmission signal set may be a transmission signal to a different reception device or may be a transmission signal to the same reception device. Here, the reception device is one of the base station device 1 and the terminal device 2. For each transmission signal set, corresponding NOMA pattern vectors are applied. An NOMA pattern vector is an example of information regarding non-orthogonal multiplexing. Here, examples of the NOMA pattern vectors include an interleave pattern, a spreading pattern, a scrambling pattern, a codebook, power allocation, and the like. In addition, although the term "NOMA pattern vector" is used here, the term may also be called a pattern or an index. Alternatively, an identifier such as a pattern or an index used in NOMA, as exemplified above, or a term indicating the pattern itself may be used. Signals after the NOMA pattern vectors are applied are multiplexed on the same frequency and time resources and are sent to the same antenna port. In addition, a transmission signal set of the same parameter set is multiplexed in FIG. 14, but a transmission signal set of different parameter sets may be multiplexed, as illustrated in FIG. 15. FIG. 15 is the same as FIG. 14 except that the transmission signal set of the different parameter sets is multiplexed.

Figure 16:
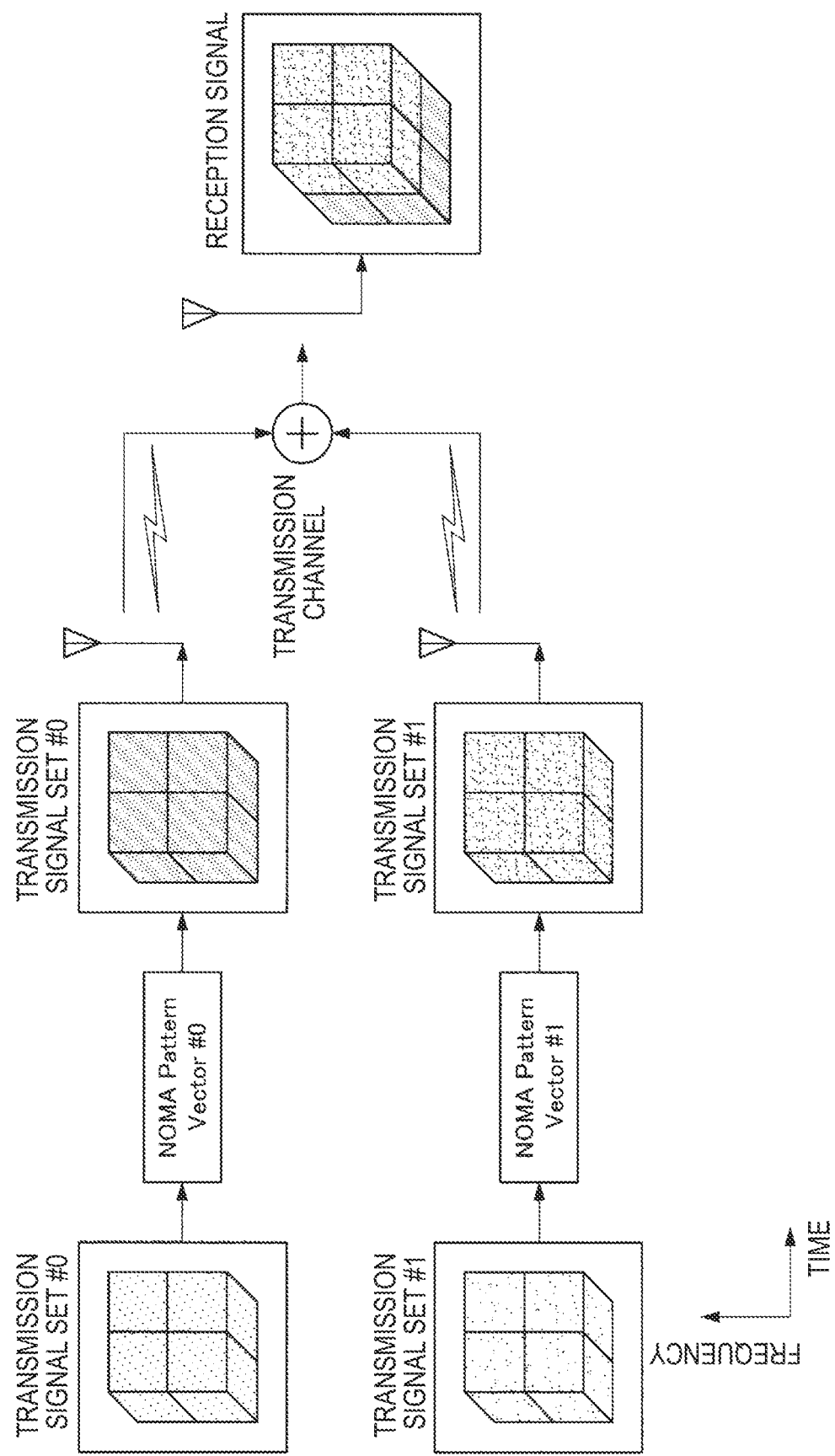
FIG. 16 is an explanatory diagram illustrating an example of a NOMA transmission process.
Figure 17:
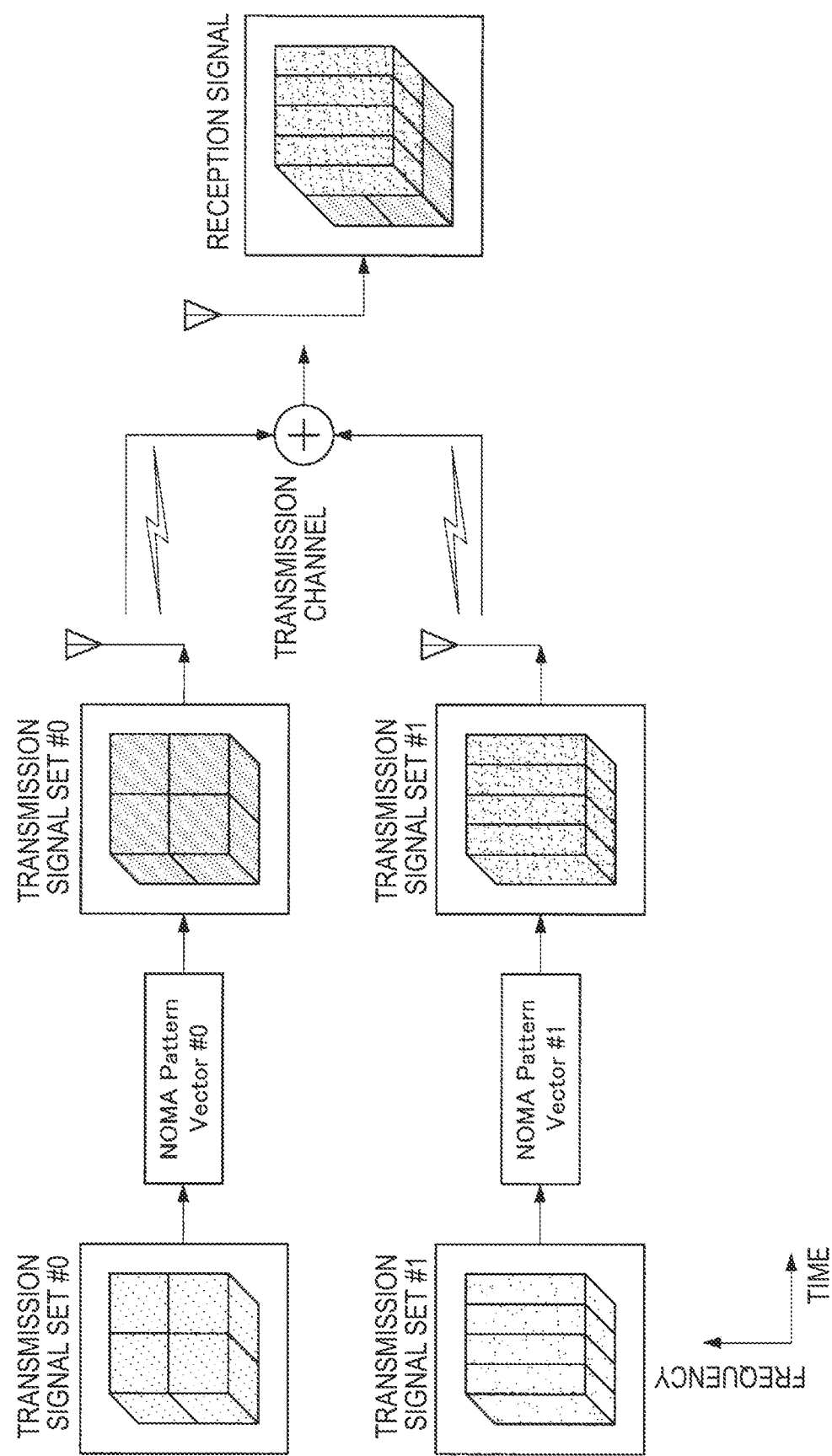
FIG. 17 is an explanatory diagram illustrating an example of a NOMA transmission process.

FIGS. 16 and 17 are explanatory diagrams illustrating an example of a NOMA transmission process. On the other hand, as illustrated in FIGS. 16 and 17, a transmission method of transmitting signals to which the NOMA, pattern vectors are applied without multiplexing in the transmission device so that the signals are subjected to the non-orthogonal multiplexing in the reception device can also be considered. For each transmission signal set, corresponding NOMA pattern vectors are applied. Here, examples of the NOMA pattern vectors include an interleave pattern, a spreading pattern, a scrambling pattern, a codebook, power allocation, and the like. The signals after the NOMA pattern vectors are applied are transmitted on the same frequency and time resources and are multiplexed through a propagation channel. In this case, each transmission signal set may be transmitted from different transmission devices. In addition, as illustrated in FIG. 17, the parameter sets of the transmission signals transmitted on the same frequency and time resources may be different parameter sets.

Figure 18:
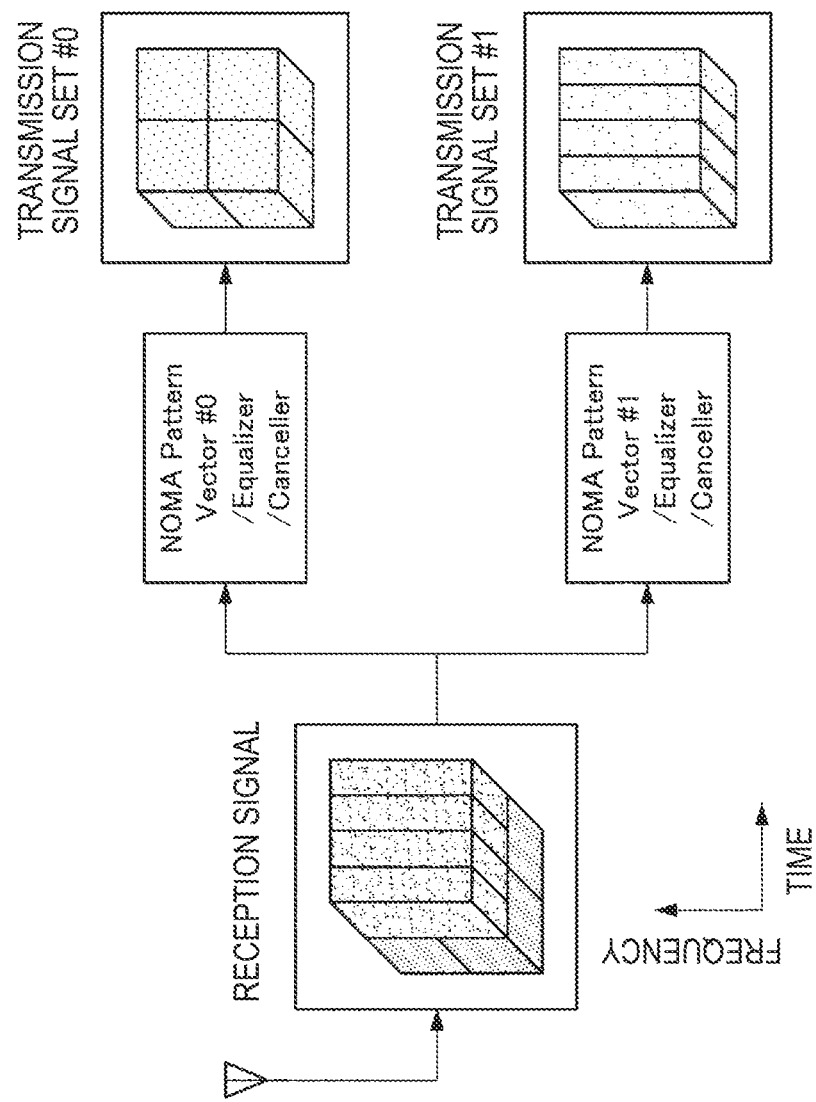
FIG. 18 is an explanatory diagram illustrating an example of a NOMA reception process.

FIG. 18 is an explanatory diagram illustrating a reception device performing a NOMA reception process. As illustrated in FIG. 18, reception signals are received in a state in which the plurality of transmission signals are multiplexed on the same frequency and time resources. In the reception device, the NOMA pattern vectors applied in the transmitter are applied in order to decode the multiplexed transmission signal sets and desired signals are extracted by a channel equalization and interference signal canceller. At this time, in a case in which the signals are multiplexed using the same NOMA pattern vectors, an influence of interference between the multiplexed signals may increase and it may be difficult to decode the signals.

As described above, it is necessary to share and apply the NOMA pattern vectors applied to the transmission device and the reception device in the NOMA transmission between the transmission device and the reception device so that the NOM pattern vectors do not overlap.

<NOMA Pattern Vector Application Technique and Notification Technique>

As described above, a technique for applying the NOMA pattern vectors in the NOMA transmission is important. Hereinafter, a decision technique and a notification technique for the NOMA pattern vectors to be applied will be described.

For example, in a case in which downlink transmission is assumed, the base station device 1 may select usable NOMA pattern vectors among NOMA pattern vectors, apply the NOMA pattern vectors, and subsequently notify the terminal device 2 of the applied NOMA pattern vectors by RRC signaling, a system information block (SIB), a DCI, or the like. In the case of downlink transmission, the base station device 1 can decide resource allocation of the plurality of terminal devices 2. Even in a case in which dynamic NOMA pattern vectors are not changed, the base station device 1 can perform transmission without increasing interference between the terminal devices 2 by allocating different frequency resources or time resources even in a case in which signals are transmitted to the plurality of terminal devices 2 to which the same NOMA pattern vectors are allocated if the NOMA pattern vectors are once allocated to the plurality of terminal devices 2.

On the other hand, in a case in which uplink transmission or sidelink transmission is assumed, the terminal device 2 needs a technique for knowing or deciding currently usable NOMA pattern vectors before transmission. For example, there is no problem when the terminal device 2 can receive resource allocation information or a NOMA pattern vector information notification in a DCI or the like. However, for example, in a case in which a use case in which the terminal device does not receive a DCI as in grant-free based transmission or out-of-coverage D2D is assumed, an application technique and a notification technique for the NOMA pattern vectors are necessary.

<Grant-Free Based Transmission and NOMA>

Grant-free based transmission indicates that the terminal device 2 performs transmission using appropriate resources although the terminal device 2 does not receive resource allocation (a grant) from the base station device 1. Here, the resources are assumed to he resources partitioned on the frequency axis and the time axis. The resources may he selected from an entire usable band or may be selected from a pre-decided resource pool. The resource pool may he decided statically as a specification or may be designated when connection with the base station device 1 is established. Since the terminal device 2 can freely select resources to be used, there is a possibility of competition of resources selected by another terminal device 2. Since signals become interference signals in the case of competition, quality of reception signals may deteriorate. Accordingly, by applying the NOMA technology to the grant-free based transmission, it is possible to further add non-orthogonal axes to the frequency axis and the time axis and separate signals on the non-orthogonal axes even in a case in which competition occurs in resources on the frequency axis and the time axis.

However, cases in which resources further compete on the non-orthogonal axes (in particular, competition of NOMA pattern vectors) sometimes occur.

Here, differences between the grant-free based transmission and the above-described semi persistent scheduling (SPS) will be clarified. In the SPS, information regarding the SPS is set in advance with RRC signaling and a signal is transmitted without a grant on the basis of the setting related to the SPS in a case in which a PDCCH or an EPDCCH for validating the SPS is received. On the other hand, the grant-free based transmission has characteristics in which a PDCCH or an EPDCCH is not received and a signal is transmitted without a grant.

Hereinafter, a technique for deciding NOMA pattern vector information assuming a case in which a DCI is not received (in other words, allocation of transmission resources is not instructed), such as grant-free based transmission or out-of-coverage D2D, will be described.

(1) Static Decision at Time of Connection Construction

First, a technique for statically deciding NOMA pattern vector information at the time of connection construction will be described.

At the time of connection construction, a method of allocating a NOMA pattern vector to each user through RRC signaling or the like is considered. The same NOMA pattern vector allocated to each user is assumed to be usable until detachment from the base station device 1. In this case, since the terminal device 2 uses the NOMA pattern vector allocated from the base station device 1, the terminal device 2 does not compete for the NOMA pattern vector with other terminal devices 2.

On the other hand, the number of NOMA pattern vectors is finite. Therefore, in a case in which the number of NOMA pattern vectors exceeds an upper limit, the NOMA pattern vectors may not be allocated, and thus it is difficult to achieve a frequency use efficiency improvement effect by new NOMA transmission. In addition, in a case in which the number of resource blocks used by the terminal devices 2 is small, the NOMA pattern vectors allocated to the terminal devices 2 are not used in unused resource blocks. Further, since the NOMA pattern vectors allocated to the terminal devices 2 remain allocated until the terminal devices 2 are detached, the allocated NOMA pattern vectors may not be used either during periods in which the terminal devices 2 do not perform transmission.

Therefore, from the viewpoint of improving the frequency use efficiency, it is preferable to dynamically notify of usable NOMA pattern vectors in units of resource blocks rather than statically deciding the NOMA pattern vectors at the time of the connection construction in some cases. In addition, this method may not be used, for example, in a case such as out-of coverage D2D communication in which no connection construction is performed. Here, this method can be used together with other decision techniques in the present embodiment.

(2) Pre-Configuration in Terminal

Next, a method of using the NOMA pattern vectors pre-configured in the terminals will be described. In a case in which, for example, a case such as out-of-coverage D2D communication in which no connection construction is performed is assumed, the terminal device 2 may not receive a signal from the base station device 1.

Accordingly, for example, a method of using the NOMA pattern vectors pre-configured in the terminal device 2 is considered. In this case, signaling of information regarding the NOMA pattern vectors to be used is unnecessary.

On the other hand, since the number of NOMA pattern vectors is finite, a case in which the same NOMA pattern vectors are pre-configured in the plurality of terminal devices 2 is considered. In this case, in a case in which the terminal devices 2 perform NOMA transmission on the same frequency and same time resources, competition for the resources occurs and error rate characteristics may deteriorate.

Accordingly, for example, a method of pre-configuring a plurality of NOMA pattern vectors in the terminal device 2 and enabling the terminal device 2 to select the NOMA pattern at random from the NOMA pattern vectors every time is considered. In any case, it is necessary for the base station device 1 or another terminal device 2 which is a reception device to blindly decode the used NOMA pattern vectors in some cases to check whether to learn the used NOMA pattern vectors through signaling or the like. Additionally, this method can be used even in a case in which connection construction is performed and can be used together with another decision technique in the present embodiment.

(3) Notification of Currently Usable NOMA Pattern Vectors by Broadcast

Next, a method in which the base station notifies of the currently usable NOMA pattern vectors by broadcast will be described. This method is a method of including information regarding NOMA pattern vectors which are currently usable and are currently used and unselectable (unusable) in a signal broadcasted by the base station device 1. Here, the base station device 1 may include only information indicating that the NOMA pattern vectors are currently usable or currently unusable as information. In addition, a broadcast signal may include, for example, a system information lock (SIB), a DCI common in a cell, an MBMS, or a NOMA pattern vector notification resource.

The terminal device 2 receives the information regarding the NOMA pattern vectors from the signal broadcasted from the base station device 1 and selects the NOMA pattern vector among the currently usable NOMA pattern vectors to use the NOMA pattern vector in NOMA transmission. Here, the information regarding the NOMA pattern vectors, for example, the following information, is broadcasted from the base station device 1.

[Math. 1]

$$\langle Vt_0, \ldots, Vt_n, \ldots, Vt_{N-1} \rangle = \langle 1, \ldots, 0, \ldots, 1 \rangle \quad \text{(Expression 1)}$$

In Expression 1, $Vt_0$ to $Vt_{N-1}$ are flags associated with the NOMA pattern vectors and the NOMA pattern vectors corresponding to the flags are known between the base station device 1 and the terminal device 2. For example, in a case in which the flag has 1, the flag indicates that the NOMA pattern vector is currently usable (not used). In a case in which the flag has 0, the flag indicates that the NOMA pattern vector is currently being used. The meaning of the value of the flag may be opposite. Alternatively, the flag that has either value may be transmitted as power 0. The terminal device 2 receiving the foregoing information selects the NOMA pattern vector which is usable, as indicated by the usable flag, and uses the selected NOMA pattern vector for NOMA transmission.

Figure 19:
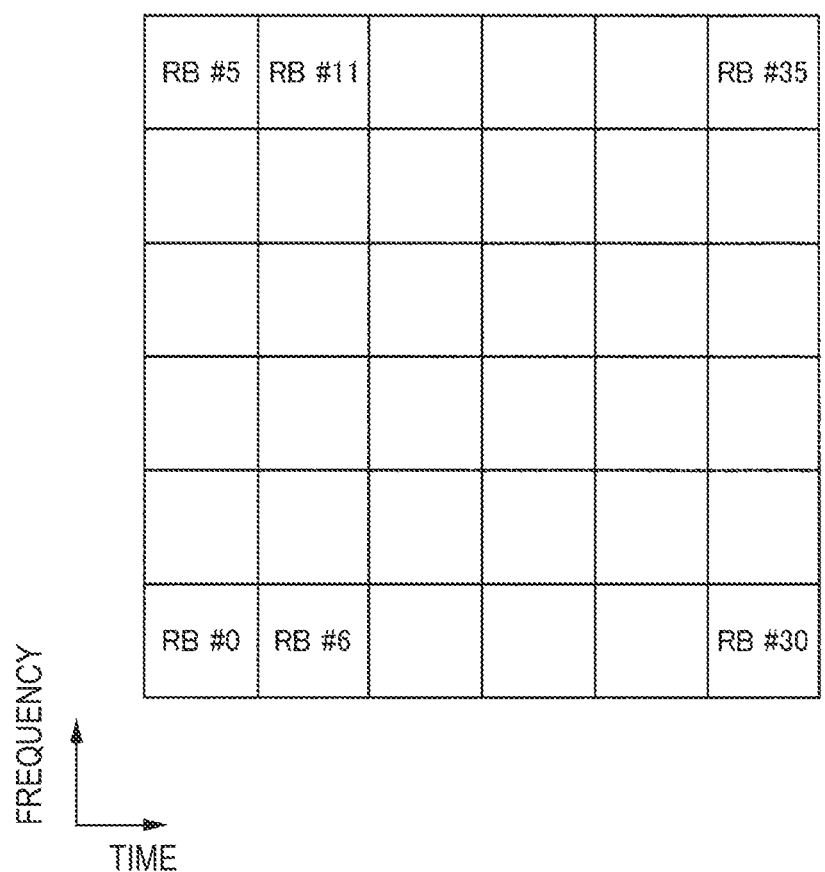
FIG. 19 is an explanatory diagram illustrating an example of a resource pool for grant-free based transmission.

In a case in which the SIB, the DCI common in a cell, the MBMS, or the like is used as the signal broadcasted, information corresponding to a target resource block is separately necessary. FIG. 19 is an explanatory diagram illustrating an example of a resource pool for grant-free based transmission. For example, a resource pool for grant-free based transmission is designated and 36 resource blocks can be used for the grant-free based transmission, as illustrated in FIG. 19. At this time, the NOMA pattern vector can be independently used for each resource block. For example, a certain terminal device 2 can use a pattern corresponding to the NOMA pattern vector $Vt_0$ in RB #0 of FIG. 19 and another terminal device 2 can use a pattern corresponding to the NOMA pattern vector $Vt_0$ in RB #1 in FIG. 19. Therefore, the base station device 1 can perform more efficient transmission by broadcasting the information regarding the usable NOMA pattern vector with regard with each RB.

Figure 20:
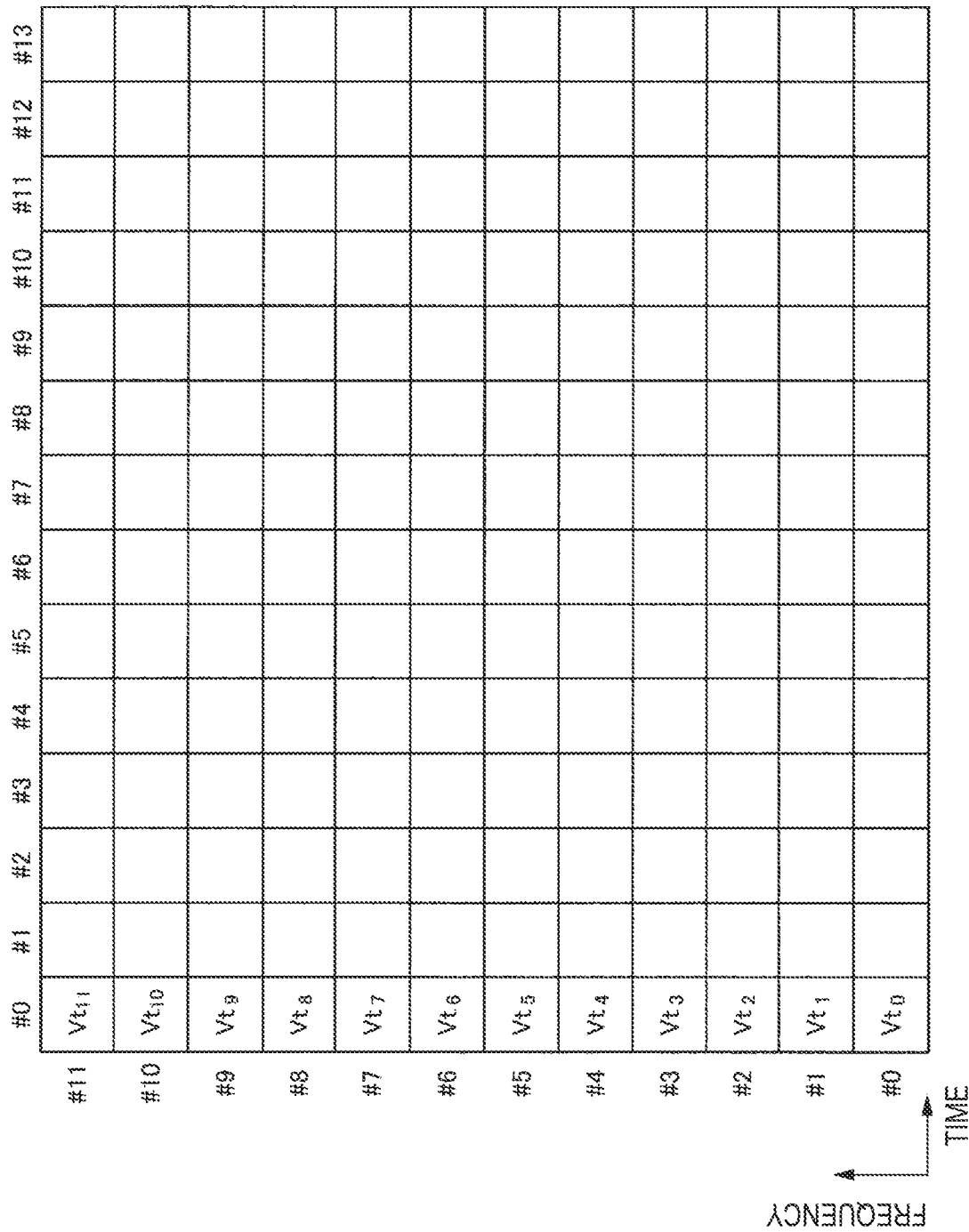
FIG. 20 is an explanatory diagram illustrating an example of NOMA pattern vector notification resources.

FIG. 20 is an explanatory diagram illustrating an example of NOMA pattern vector notification resources in one resource block. One resource block is illustrated in FIG. 20. For example, in a case in which the NOMA pattern vector notification resources are ensured in each resource block as in FIG. 20, the base station device 1 can notify of the information regarding the usable NOMA pattern vectors for each resource block. The base station device 1 may merely notify of the information regarding the NOMA pattern vectors using the resources. Note that, for example, the control unit 103 can ensure the NOMA pattern vector notification resources.

On the other hand, in a case in which the SIB, the DCI common in a cell, the MBMS, or the like is used for transmission, information indicating which resource block the information expressed in Expression 1 indicates is separately necessary in the terminal device 2. Accordingly, the base station device 1 preferably notifies the terminal device 2 of the information as well. For example, it is considered that index information of the resource block is added to the notification information as in Expression 2. $RB_{Index}$ indicates the index information of the resource block.

[Math. 2]

$$\langle RB_{index}, Vt_0, \ldots, Vt_n, \ldots, Vt_{N-1} \rangle = \\ \langle 110101, \ldots, 0, \ldots, 1 \rangle \quad \text{(Expression 2)}$$

The base station device 1 or another terminal device 2 which is a reception device decodes the used NOMA pattern vectors to check whether to learn the used NOMA pattern vectors through signaling or the like or that the NOMA pattern vectors are all used. In addition, this method can be used together with another decision technique in the present embodiment.

<Notification Technique for Applied NOMA Pattern Vector>

The terminal device 2 may notify or may not notify the base station device 1 or another terminal device 2 which is a reception device of the information regarding the applied NOMA pattern vectors. In a case in which the terminal device 2 does not notify of the information, the base station device 1 or the other terminal device 2 which is the reception device attempts decoding to check that the assumed NOMA pattern vectors are all used. In this case, since the notification is unnecessary, signaling overhead can be reduced. Conversely, as the total number of NOMA pattern vectors increases, complexity of the decoding process in the reception device increases.

Figure 21:
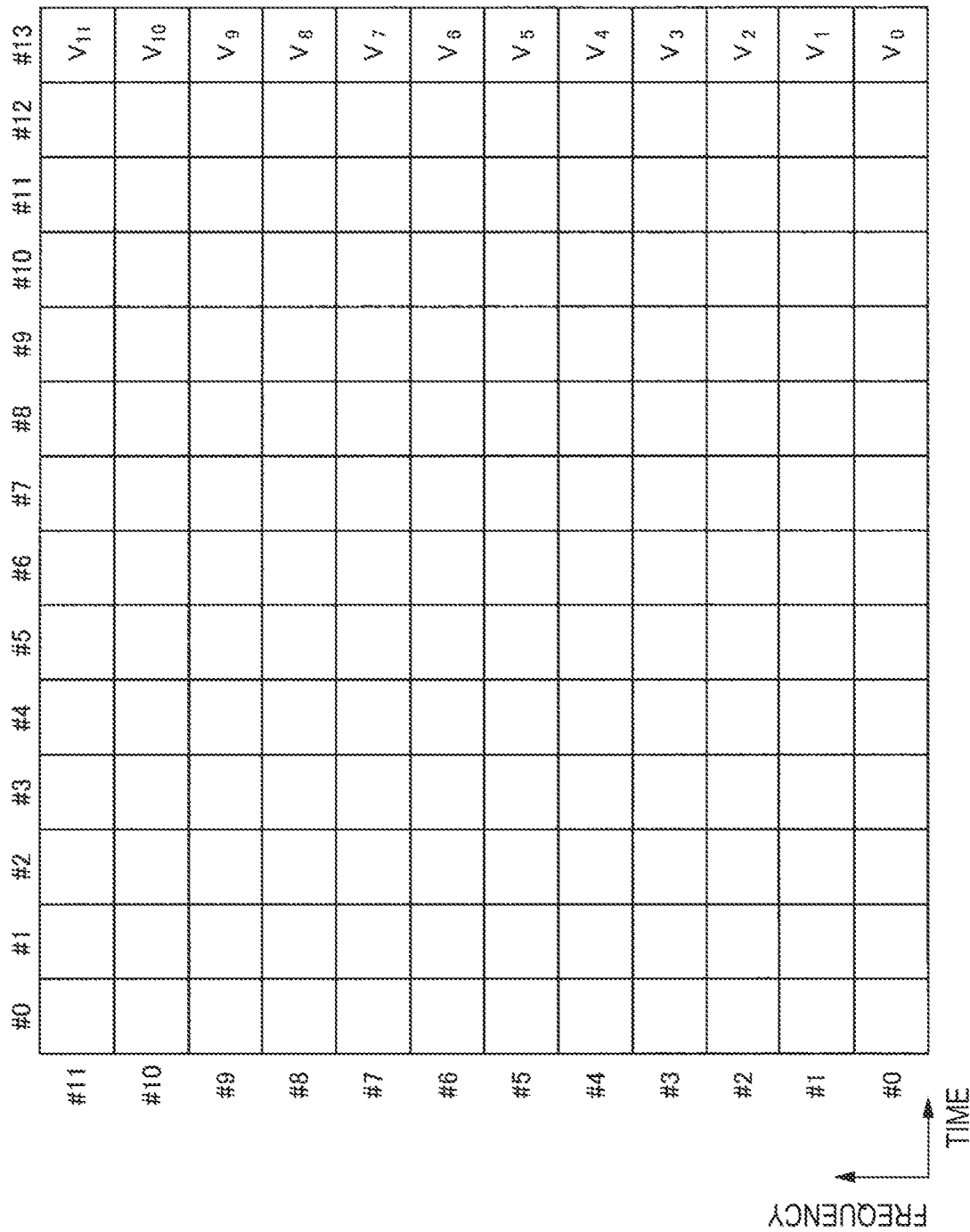
FIG. 21 is an explanatory diagram illustrating an example of NOMA pattern vector notification resources.

Therefore, depending on a situation, it is preferable that the terminal device 2 notify the reception device side of the information regarding the applied NOMA pattern vectors to reduce a calculation amount on the reception side. In a case in which the terminal device 2 notifies of the information regarding the applied NOMA pattern vectors, a method of notifying of the information using NOMA pattern vector notification resources is considered. FIG. 21 is an explanatory diagram illustrating an example of NOMA pattern vector notification resources. The resources in FIG. 21 are assumed to be a resource pool which can be transmitted through the grant-free based transmission. In addition, resources of time #13 are assumed to be resources for notifying of the NOMA pattern vectors.

Here, the resources for notifying of the NOMA pattern vectors may be any resources other than the resources of time axis 413 or the number of resources may be changed. The resources to be used may be decided in advance or may he notified of by the base station device 1. In addition, the terminal device 2 may notify the base station device 1 of the information regarding the applied NOMA pattern vectors within the same unit frame time.

When the NOMA pattern vectors to be used are decided, the terminal device 2 performs the NOMA transmission using the resource pool which can be transmitted through the grant-free based transmission in accordance with the above-described techniques 1 to 3 or the like. Here, the terminal device 2 transmits the flag indicating the use with a resource element corresponding to the used NOMA pattern vector. For example, in a case in which the NOMA transmission is performed using NOMA, pattern vector $V_0$, the terminal device 2 transmits a flag (for example, "1" or the like) indicating the use with the resource elements of frequency #13 and time #13 in the example of FIG. 21. At this time, the terminal device 2 may transmit or may not transmit a flag (for example, "0" or the like) indicating the nonuse with the resource element corresponding to the unused NOMA pattern vector. In a case in which nothing is transmitted, power is 0. Therefore, the reception device can also determine which NOMA pattern vector is used by measuring power. The notifications are transmitted from the plurality of terminal devices 2 using the same resource pool and the reception device receives the plurality of notifications in a combined state.

Figure 22:
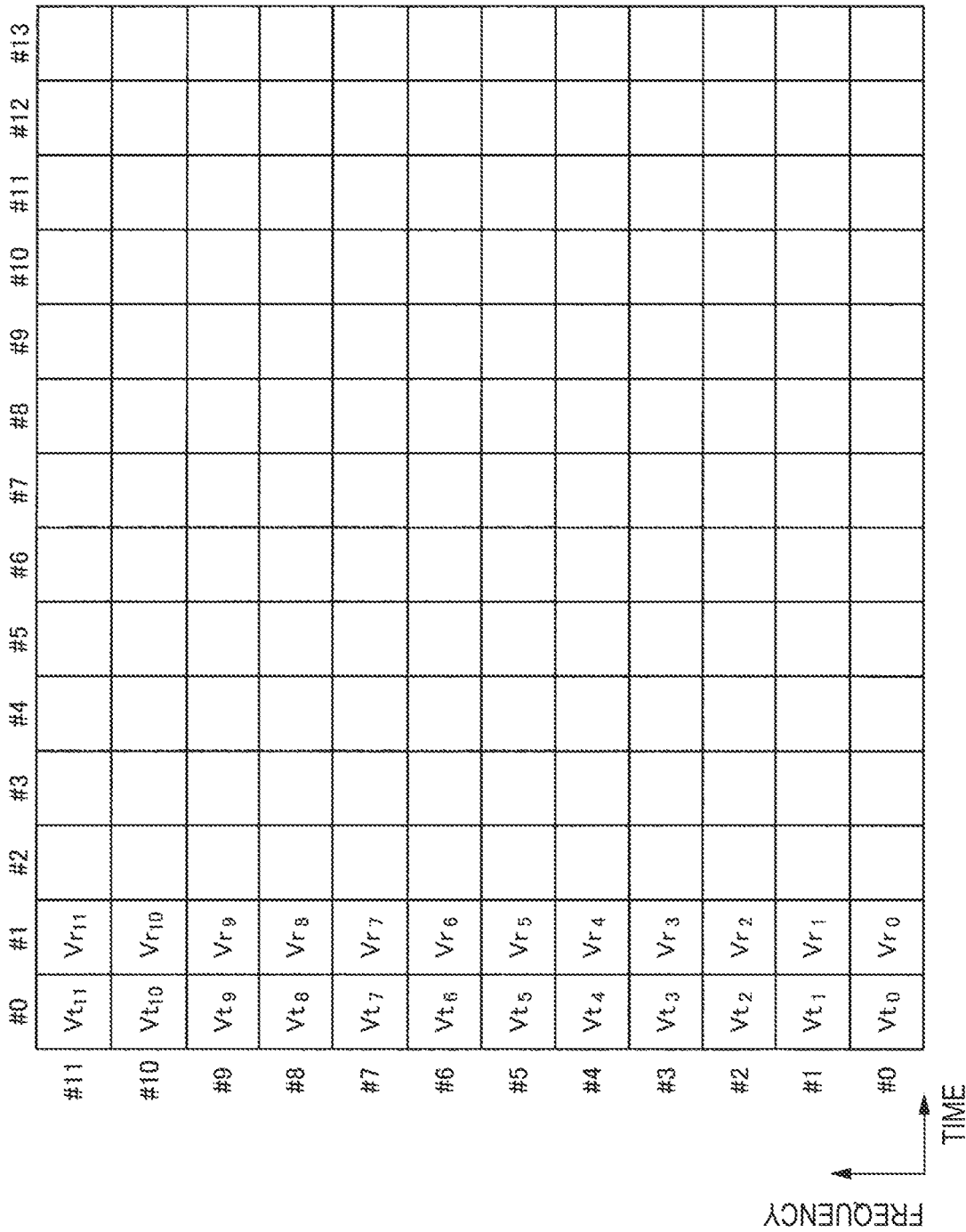
FIG. 22 is an explanatory diagram illustrating an example of resource mapping.

In addition, the reception device receiving the notifications may notify the terminal devices 2 of a reception result. For example, as a result obtained by detecting the used NOMA pattern vectors, it is assumed that it can be learned that the plurality of terminal devices 2 use the same NOMA, pattern vectors. At this time, the reception device can lower a possibility of the NOMA pattern vectors competing at the time of subsequent transmission of the terminal devices 2 by notifying the terminal device 2 of information indicating that the same NOMA pattern vectors are used. Accordingly, for example, the information is considered to be notified of as in Expression 3. In addition, an example of FIG. 22 is considered as the resource mapping.

[Math. 3]

$$\langle Vt_0, \ldots, Vt_n, \ldots, Vt_{N-1} \rangle = \langle 1, \ldots, \\ 0, \ldots, 1 \rangle \quad \text{(Expression 3)}$$

A correspondent example of a $Vt_n$ and $Vr_n$ hit sequence is as follows. $Vt_n$ and $Vt_n$ will be described below in order.

00: unusability of corresponding NOMA pattern vectors+ non-detection of use of NOMA pattern vectors In a case in which the corresponding NOMA pattern vectors are unusable and use of the NOMA pattern vectors is not detected, bit sequences are combined. Since use of the unusable NOMA pattern vectors is not detected, the terminal device 2 during the transmission continues this combination and performs transmission without using the corresponding NOMA pattern vectors.

01: unusability of corresponding NOMA pattern vectors+ detection of use of NOMA pattern vectors In a case in which the corresponding NOMA pattern vectors are unusable and the use of the NOMA pattern vectors is detected, the bit sequences are combined. As a case to be considered, a case in which the NOMA pattern vectors are originally used, but are changed to unusable NOMA pattern vectors from a transmission frame or a case in which the terminal device 2 erroneously selects the NOMA patter vectors or the like is considered. In either case, the terminal device 2 using the NOMA pattern vectors attempt to use other NOMA pattern vectors.

10: usability of corresponding NOMA pattern vectors+ non-detection of use of NOMA pattern vectors In a case in which the corresponding NOMA pattern vectors are usable and the use of the NOMA pattern vectors is not detected, the bit sequences are combined. That is, the terminal device 2 does not use the NOMA pattern vectors. For example, the terminal device 2 that newly starts transmission, the terminal device 2 that has to examine a change in the NOMA pattern vectors, or the like, for example, selects the NOMA pattern vectors to be used among the NOMA pattern vectors corresponding to the bit sequence.

11: usability of corresponding NOMA pattern vectors+ detection of use of NOMA pattern vectors In a case in which the corresponding NOMA pattern vectors are usable and the use of the NOMA pattern vectors is detected, the bit sequences are combined. That is, for example, the terminal device 2 that newly starts transmission, the terminal device 2 that has to examine a change in the NOMA pattern vectors, or the like may avoid selection of the NOMA pattern vectors to be used among the NOMA pattern vectors corresponding to the bit sequence.

Figure 23:
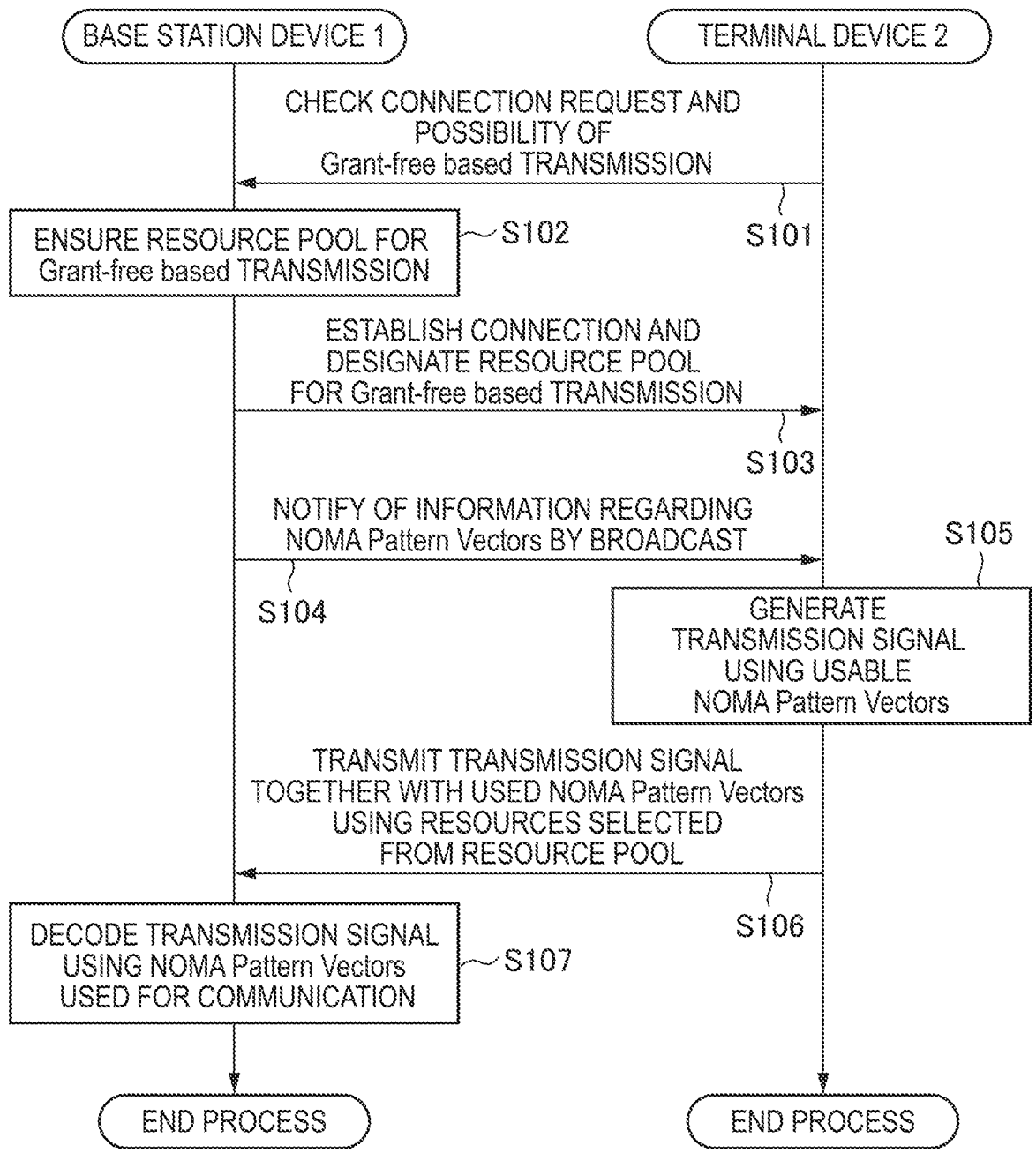
FIG. 23 is a flowchart illustrating an example of a NOMA pattern vector notification sequence between a transmission device (for example, a base station device 1) and a reception device (a terminal device 2).

FIG. 23 is a flowchart illustrating an example of a NOMA pattern vector notification sequence between a transmission device (for example, the base station device 1) and a reception device (the terminal device 2).

The terminal device 2 checks a connection request and possibility of the grant-free based transmission to the base station device 1 (step S101). Note that the terminal device 2 may not check the possibility of the grant-free based transmission.

When the grant-free based transmission is possible, the base station device 1 ensures the resource pool for the grant-free based transmission as necessary (step S102) and performs establishment of connection with the terminal device 2, position designation of the resource pool, and designation of NOMA pattern vector information notification resources (step S103).

The base station device 1 periodically notifies of the information regarding the NOMA pattern vectors by broadcast (step S104). The terminal device 2 periodically reads the information regarding the NOMA pattern vectors broadcasted from the base station device 1 and generates a transmission signal using the usable NOMA pattern vectors (step S105). Here, the broadcasted information regarding the NOMA pattern vectors include information expressed with the foregoing $Vt_n$ and $Vtr_n$, in addition, as a method of selecting the NOMA pattern vectors, random selection on the basis of the broadcasted information regarding the NOMA pattern vectors, selection on the basis of a channel state, selection on the basis of positional information of the terminal device, selection of a pattern with low correlation with a used pattern on the basis of a selection situation of the NOMA pattern vectors, or the like is considered. For example, in a case in which a spreading pattern is assumed as an example of the pattern with the low correlation, correlation between a pattern in which 1 bit is spread to <1, 1, 0, 0> and 4 bits and a pattern in which 1 bit is spread to <0, 0, 1, 1> and 4 bits can be said to be low. At this time, in a case in which the latter pattern is not used during use of the former pattern, it is considered that the latter pattern is selected. Note that the terminal device 2 may select the NOMA pattern vectors by combining the above-described selection methods or may independently select the NOMA pattern vectors.

Thereafter, the terminal device 2, selects any resources from the resource pool and transmits the transmission signal. At this time, the terminal device 2 transmits the information regarding the used NOMA pattern vectors together using the designated resources (step S106). The base station device 1 decodes the information regarding the NOMA pattern vectors, checks all the used NOMA pattern vectors, and subsequently attempts to decode the transmission signal (step S107). For example, the receiving unit 105 can perform the decoding.

<Embodiment in LTE Cell/NR Cell Dual Connectivity and Carrier Aggregation>

As described above, in a case in which an operation in dual connectivity of an LTE cell and an NR cell is considered as an example and the LTE cell is used as PCell and the NR cell is operated as SCell, notification of the NOMA pattern vectors is considered to be notification with the LTE cell which is PCell. Alternatively, the NR cell is considered to be operated as PSCell and the notification of the NOMA pattern vectors is considered to be performed with PSCell. In this case, notification performed with a signal broadcast with PCell of the LTE cell or PSCell of the NR cell is considered as an example. The broadcast signal indicates, for example, a system information block (SIB), a DCI common in a cell, an MBMS, or a NOMA pattern vector notification resource. On the other hand, notification of the NOMA pattern vectors may be performed with PSCell of the NR cell. Similarly, the signal which is notified of with the broadcast signal and broadcast indicates, for example, a system information block (SIB), a DCI common in a cell, an MBMS, or a NOMA pattern vector notification resource. In the present embodiment, since the broadcast signal is transmitted with a different band from the resources for the grant-free based transmission, association information indicating which resource block the information regarding the notified. NOMA pattern vector represents is necessary as in the foregoing Expression 2.

<Notification and Change Technique for NOMA Pattern Vector in SPS Environment>

Next, an application example in an SPS environment will be described. As described above, the PDCCH or the EPDCCH for validating the SPS is received in the SPS, and then the grant-free transmission starts. At this time, designation of the NOMA pattern vectors used by the terminal device 2 in the PDCCH or the EPDCCH for validating the SPS is considered as an example.

However, for example, in a case in which the SPS and the grant-free based transmission are used together in the same band, a case in which competition for the NOMA pattern vectors or the like occurs is considered. At this time, it is preferable to dynamically change the NOMA pattern vectors of the terminal device 2 transmitted with the SPS.

Accordingly, the terminal device 2 during the transmission with the SPS can switch the NOMA pattern vectors with other usable NOMA pattern vectors and continue the transmission by reading the information regarding the NOMA pattern vectors notified of by broadcast in the present technology, for example, in a case in which the NOMA pattern vectors which are being used are unusable.

Figure 24:
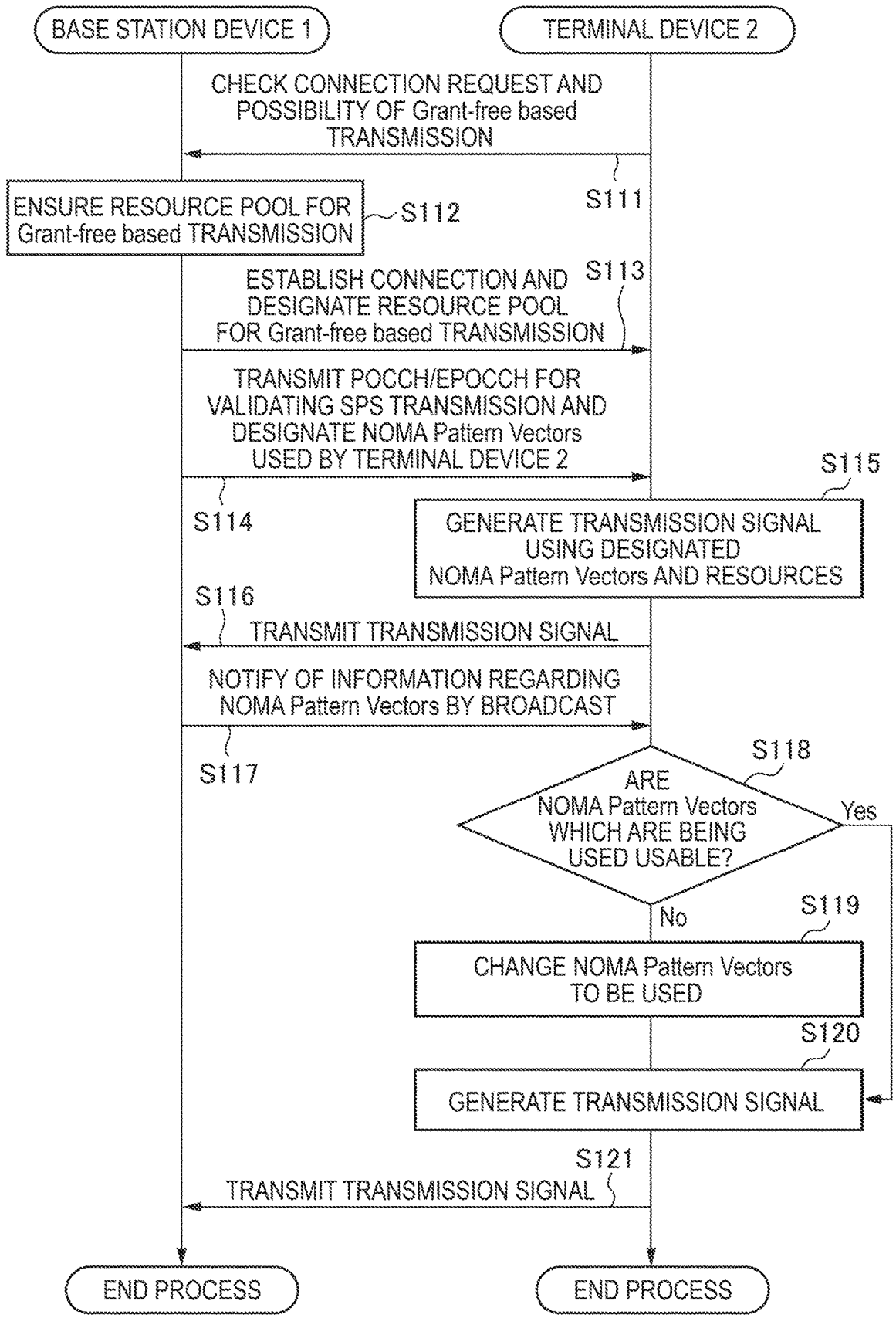
FIG. 24 is a flowchart illustrating an example of the NOMA pattern vector notification sequence between a transmission device (for example, the base station device 1) and a reception device (the terminal device 2).

FIG. 24 is a flowchart illustrating an example of the NOMA pattern vector notification sequence between a transmission device (for example, the base station device 1) and a reception device (the terminal device 2).

The terminal device 2 checks a connection request and possibility of the grant-free based transmission to the base station device 1 (step S111). Note that the terminal device 2 may not check the possibility of the grant-free based transmission.

When the grant-free based transmission is possible, the base station device 1 ensures the resource pool for the grant-free based transmission as necessary (step S112) and performs establishment of connection with the terminal device 2, position designation of the resource pool, and designation of NOMA pattern vector information notification resources (step S113).

The base station device 1 transmits the PDCCH or the EPDCCH for validating the SPS and transmits information for designating the NOMA pattern vectors used by the terminal device 2 (step S114). The terminal device 2 generates a transmission signal using the designated NOMA pattern vectors and the resources (step S115). The generated transmission signal is transmitted (step S116).

The base station device 1 periodically notifies of the information regarding the NOMA pattern vectors by broadcast (step S117). The terminal device 2 periodically reads the information regarding the NOMA pattern vectors broadcasted from the base station device 1 and determines whether the NOMA pattern vectors which are currently being used are usable (step S118).

When the NOMA pattern vectors which are currently being used are not usable (No in step S118), the terminal device 2 changes the NOMA pattern vectors to be used (step S119). When the NOMA pattern vectors which are currently being used are usable (Yes in step S118), the terminal device 2 does not change the NOMA pattern vectors to be used.

Then, the terminal device 2 generates a transmission signal using the NOMA pattern vectors and the resources (step S120). The generated transmission signal is transmitted (step S121). At this time, when the NOMA pattern vectors to be used are changed, the terminal device 2 preferably notifies the base station device 1 of the information regarding the NOMA pattern vectors to be used after the change. The base station device 1 can efficiently notify the terminal device 2 of the information regarding the NOMA pattern vectors and can notify the terminal devices 2 overlapping in the NOMA pattern vectors of the overlap by performing a series of operations, in addition, the terminal device 2 can acquire the information regarding the NOMA pattern vectors from the base station device 1 and can acquire the information regarding the unusable NOMA pattern vectors from the base station device 1 by performing a series of operations.

APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or semi-permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

(Application Examples for Base Station)

First Application Example

Figure 25:
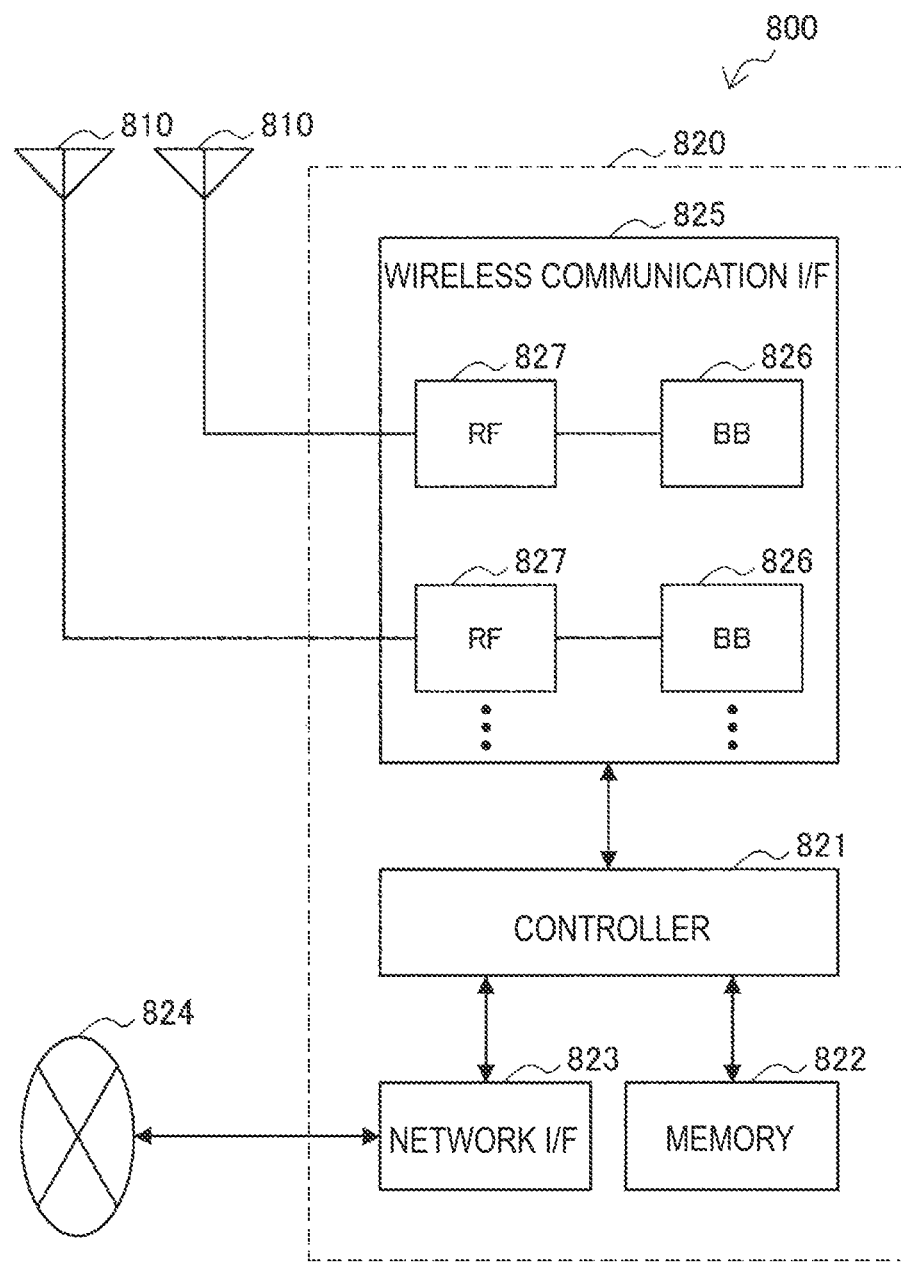
FIG. 25 is a block diagram illustrating a first example of a schematic configuration of an eNB to which the technology according to the present disclosure may be applied.

FIG. 25 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 25, and the plurality of antennas 810 may, for example, correspond to a plurality of frequency bands used by the eNB 800. It should be noted that while FIG. 25 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing,/demultiplexing, and the like, and performs a variety of signal processing on each layer (e.g., L1, medium access control (MAC), radio link control (RLC), and packet data convergence protocol (PDCP)), The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 25, and the plurality of BB processors 826 may, for example, correspond to a plurality of frequency bands used by the eNB 800. Further, the wireless communication interface 825 may also include a plurality of the RF circuits 827, as illustrated in FIG. 25, and the plurality of RF circuits 827 may, for example, correspond to a plurality of antenna elements. Note that FIG. 25 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 25, one or more constituent elements (for example, the higher layer processing unit 101 and/or the control unit 103) included in the base station device 1 described with reference to FIG. 8 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 25, the receiving unit 105 and the transmitting unit 107 described with reference to FIG. 8 may be implemented in the wireless communication interface 825 (for example, the RF circuit 827). Further, the transceiving antenna 109 may be implemented in the antenna 810. In addition, an interface between the higher layer processing unit 101 and a higher node or another base station device may be mounted on the controller 821 and/or the network interface 823.

Second Application Example

Figure 26:
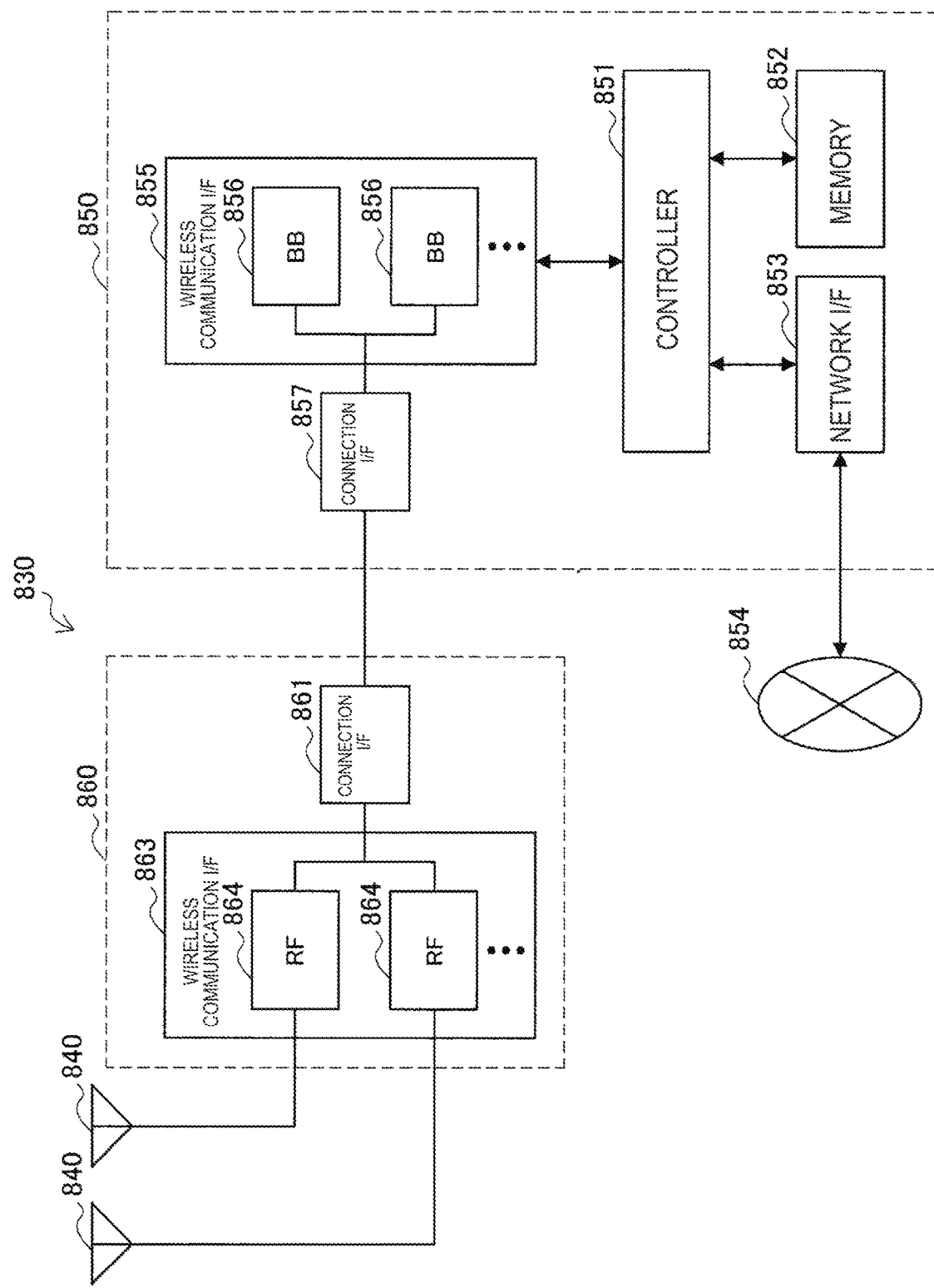
FIG. 26 is a block diagram illustrating a second example of the schematic configuration of the eNB to which the technology according to the present disclosure may be applied.

FIG. 26 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RE cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 26, and the plurality of antennas 840 may, for example, correspond to a plurality of frequency bands used by the eNB 830. Note that FIG. 26 illustrates an example in which the eNB 830 includes the plurality of antennas 840, but the eNB 830 may include the single antenna 840.

The base station apparatus 850 includes a controller 851, a memory 852, a network interface 85'3, a wireless communication interface 855, and a connection interface 857. The controller 851, the memory 852, and the network interface 853 are similar to the controller 821, the memory 822, and the network interface 823 described with reference to FIG. 25.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 25 except that the BB processor 856 is connected to an RF circuit 864 of the RRH 860 via the connection interface 857. The wireless communication interface 855 may include a plurality of the BB processors 856, as illustrated in FIG. 26, and the plurality of BB processors 856 may, for example, correspond to a plurality of frequency bands used by the eNB 830. Note that FIG. 26 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 26, and the plurality of RF circuits 864 may, for example, correspond to a plurality of antenna elements. Note that FIG. 26 illustrates an example in which the wireless communication interface 863 includes the plurality of RF circuits 864, but the wireless communication interface 863 may include the single RF circuit 864.

In the eNB 830 illustrated in FIG. 26, one or more constituent elements (for example, the higher layer processing unit 101 and/or the control unit 103) included in the base station device 1 described with reference to FIG. 8 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 825 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 26, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840. In addition, an interface between the higher layer processing unit 101 and a higher node or another base station device may be mounted on the controller 851 and/or the network interface 853.

(Application Examples for Terminal Apparatus)

First Application Example

Figure 27:
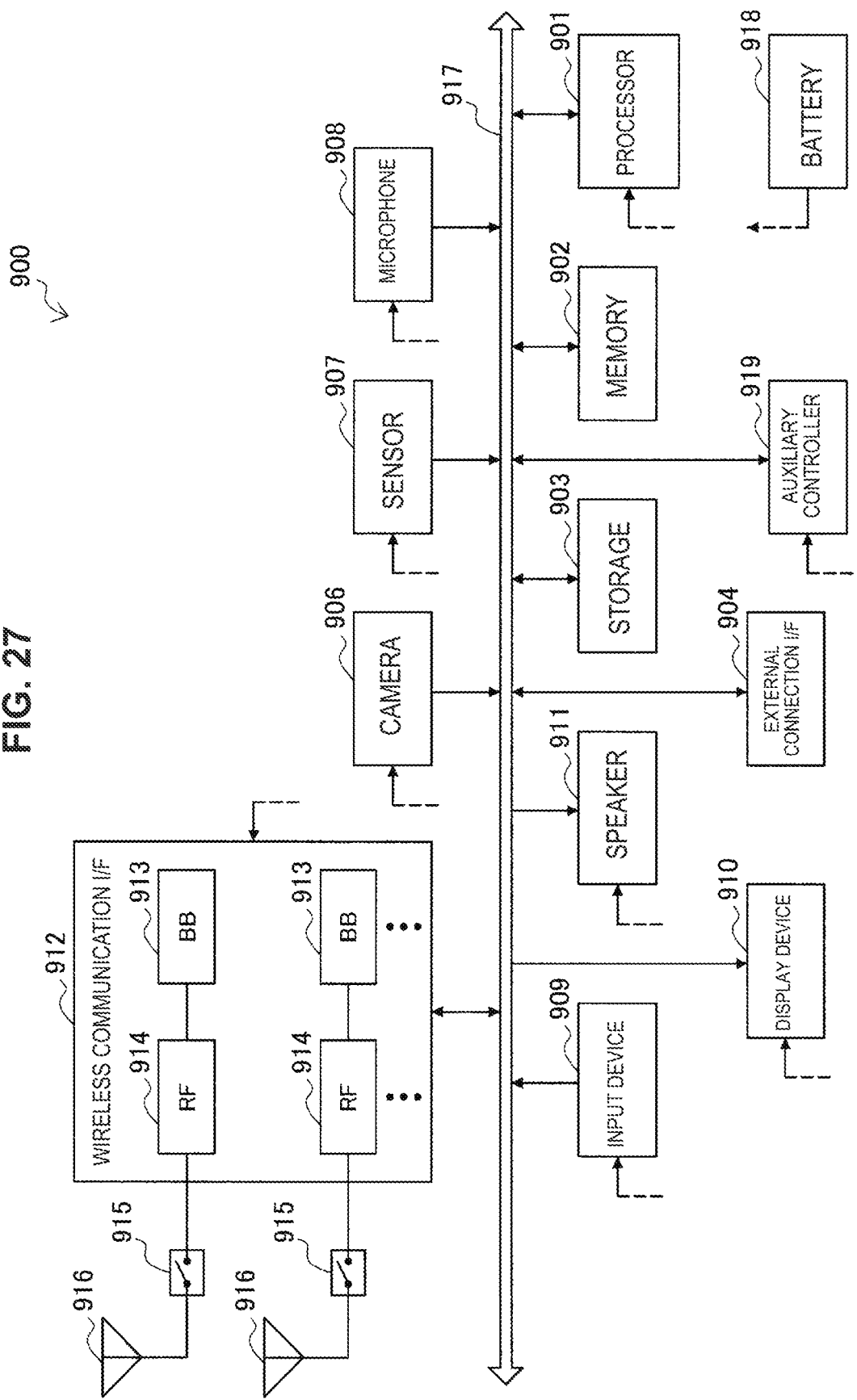
FIG. 27 is a block diagram illustrating an example of a schematic configuration of a smartphone 900 to which the technology according to the present disclosure may be applied.

FIG. 27 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RE circuit 914 may include a mixer, a filter, an amplifier, and the like, and transmits and receives a wireless signal via the antenna 916. The wireless communication interface 912 may he a one-chip module in which the BB processor 913 and the RF circuit 914 are integrated. The wireless communication interface 912 may include a plurality of BB processors 913 and a plurality of RE circuits 914 as illustrated in FIG. 27. Note that FIG. 27 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 27. Note that FIG. 27 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 27 via a feeder line that is partially illustrated in the figure as a dashed line. The auxiliary controller 919, for example, operates a minimally necessary function of the smartphone 900 in a sleep mode.

In the smartphone 900 illustrated in FIG. 27, one or more constituent elements included in the terminal device 2 (the higher layer processing unit 201 and the control unit 203) described with reference to FIG. 9 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 27, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

Second Application Example

Figure 28:
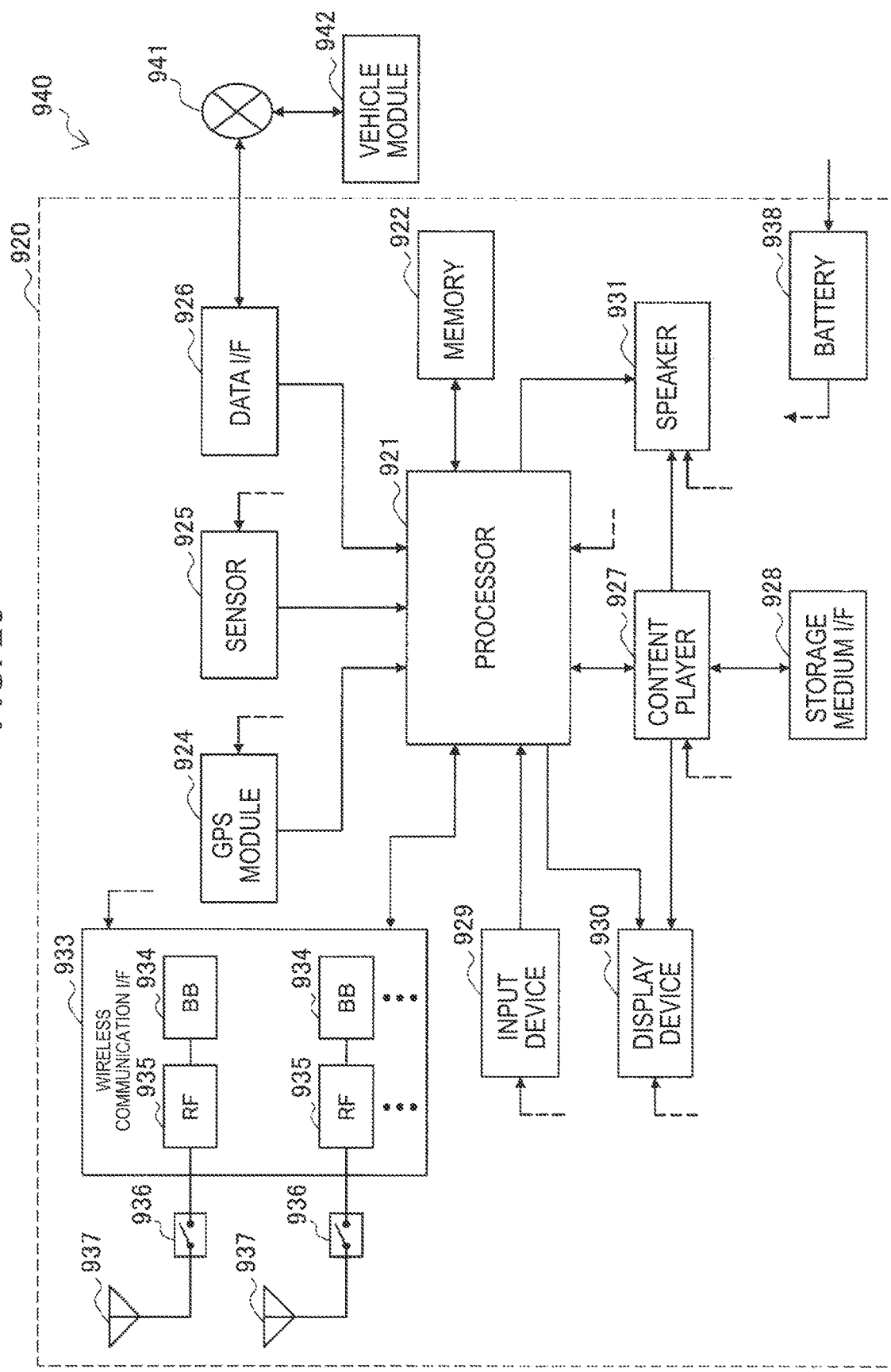
FIG. 28 is a block diagram illustrating an example of a schematic configuration of a car navigation apparatus 920 to which the technology according to the present disclosure may be applied.

FIG. 28 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may he, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 28. Note that FIG. 28 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 28. Note that FIG. 28 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 28 via a feeder line that is partially illustrated in the figure as a dashed line. Further, the battery 938 accumulates the electric power supplied from the vehicle.

In the car navigation 920 illustrated in FIG. 28, one or more constituent elements included in the terminal device 2 (the higher layer processing unit 201 and/or the control unit 203) described with reference to FIG. 9 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In this way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 28, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

2. CONCLUSION

According to the embodiments of the present disclosure, as described above, an improvement in transmission efficiency and a reduction in complexity of the decoding process can be realized in the wireless communication system in which the base station device and the terminal device communicate with each other.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the processes described with reference to the flowcharts and the sequence diagrams in the present specification may not necessarily be performed in the sequences illustrated. In the drawings. Several processing steps may be performed in parallel. In addition, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)

A communication device including:

a setting unit configured to set a predetermined resource pool to be used for transmission and information regarding non-orthogonal multiplexing in a first device; and a transmission processing unit configured to broadcast the information regarding the non-orthogonal multiplexing.

(2)

The communication device according to (1), in which the transmission processing unit stores the information regarding the non-orthogonal multiplexing in a predetermined resource for storing the information regarding the non-orthogonal multiplexing to broadcast the information regarding the non-orthogonal multiplexing.

(3)

The communication device according to (1), including:

a reception processing unit configured to decode a signal subjected to the non-orthogonal multiplexing on same frequency and time resources using the information regarding the non-orthogonal multiplexing.

(4)

The communication device according to (3), in which the reception processing unit receives a signal transmitted by the first device by selecting an appropriate resource from the resource pool.

(5)

The communication device according to (3), in which the reception processing unit receives a signal with regard to a signal transmitted from the first device without resource allocation.

(6)

The communication device according to any one of (1) to (5), in which the transmission processing unit broadcasts use or nonuse of the information regarding the non-orthogonal multiplexing.

(7)

The communication device according to any one of (1) to (6), in which the transmission processing unit transmits an indication that the same information regarding the non-orthogonal multiplexing is used to a device using the same information regarding the non-orthogonal multiplexing.

(8)

The communication device according to any one of (1) to (7), in which the information regarding the non-orthogonal multiplexing includes information regarding an interleave pattern.

(9)

The communication device according to any one of (1) to (8), in which the information regarding the non-orthogonal multiplexing includes information regarding a scrambling pattern.

(10)

The communication device according to any one of (1) to (9), in which the information regarding the non-orthogonal multiplexing includes information regarding a spreading signal pattern.

(11)

The communication device according to any one of (1) to (10), in which the information regarding the non-orthogonal multiplexing includes information regarding a codebook.

(12)

The communication device according to any one of (1) to (11), in which the information regarding the non-orthogonal multiplexing includes information regarding a power level.

(13)

The communication device according to any one of (1) to (12), in which the predetermined resource pool is designated by the communication device, the first device, or a second device different from the communication device and the first device.

(14)

A communication device including:

a reception processing unit configured to receive broadcasted information regarding non-orthogonal multiplexing from a first device; and a transmission processing unit configured to transmit a signal subjected to the non-orthogonal multiplexing on same frequency and time resources using the information regarding the non-orthogonal multiplexing to the first device, in which the transmission processing unit transmits the information regarding the non-orthogonal multiplexing to the first device.

(15)

The communication device according to (14), in which the transmission processing unit notifies the first device of the information regarding the non-orthogonal multiplexing within a same unit frame time.

(16)

The communication device according to (14) or (15), in which the transmission processing unit uses other information regarding the non-orthogonal multiplexing when the used information regarding the non-orthogonal multiplexing is not usable.

(17)

The communication device according to (16), in which the transmission processing unit notifies the first device of the newly used information regarding the non-orthogonal multiplexing.

(18)

The communication device according to any one of (14) to (17), in which the information regarding the non-orthogonal multiplexing includes information regarding an interleave pattern.

(19)

The communication device according to any one of (14) to (18), in which the information regarding the non-orthogonal multiplexing includes information regarding a scrambling pattern.

(20)

The communication device according to any one of (14) to (19), in which the information regarding the non-orthogonal multiplexing includes information regarding a spreading signal pattern.

(21)

The communication device according to any one of (14) to (20), in which the information regarding the non-orthogonal multiplexing includes information regarding a codebook.

(22)

The communication device according to any one of (14) to (21), in which the information regarding the non-orthogonal multiplexing includes information regarding a power level.

(23)

A communication method including:

setting a predetermined resource pool to be used for transmission and information regarding non-orthogonal multiplexing in a first device; and broadcasting the information regarding the non-orthogonal multiplexing.

(24)

A communication method including:

receiving broadcasted information regarding non-orthogonal multiplexing from a first device:

transmitting a signal subjected to the non-orthogonal multiplexing on same frequency and time resources using the information regarding the non-orthogonal multiplexing to the first device; and transmitting the information regarding the non-orthogonal multiplexing to the first device.

(25)

A computer program causing a computer to:

set a predetermined resource pool to be used for transmission and information regarding non-orthogonal multiplexing in a first device; and broadcast the information regarding the non-orthogonal multiplexing.

(26)

A computer program causing a computer to:

receive broadcasted information regarding non-orthogonal multiplexing from a first device;

transmit a signal subjected to the non-orthogonal multiplexing on same frequency and time resources using the information regarding the non-orthogonal multiplexing to the first device; and transmit the information regarding the non-orthogonal multiplexing to the first device.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
203 control unit
205 receiving unit
2051 decoding unit 2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A communication device comprising:
circuitry configured to set a predetermined resource pool to be used for grant-free transmission and information regarding non-orthogonal multiplexing in a first device, wherein the information regarding non-orthogonal multiplexing comprises a notification of pattern vectors;
periodically broadcast the information regarding the non-orthogonal multiplexing: and
receive a transmission from the first device comprising a second notification of a set of the pattern vectors to be used.

2. The communication device according to claim 1, wherein the circuitry is further configured to store the information regarding the non-orthogonal multiplexing in a predetermined resource for storing the information regarding the non-orthogonal multiplexing to broadcast the information regarding the non-orthogonal multiplexing.

3. The communication device according to claim 1, wherein the circuitry is further configured to decode a signal subjected to the non-orthogonal multiplexing on same frequency and time resources using the information regarding the non-orthogonal multiplexing.

4. The communication device according to claim 3, wherein the circuitry is further configured to receive a signal transmitted by the first device by selecting an appropriate resource from the resource pool.

5. The communication device according to claim 3, wherein the circuitry is further configured to receive a signal with regard to a signal transmitted from the first device without resource allocation.

6. The communication device according to claim 1, wherein the circuitry is further configured to broadcast use or nonuse of the information regarding the non-orthogonal multiplexing.

7. The communication device according to claim 1, wherein the circuitry is further configured to transmit an indication that the same information regarding the non-orthogonal multiplexing is used to a device using the same information regarding the non-orthogonal multiplexing.

8. The communication device according to claim 1, wherein the information regarding the non-orthogonal multiplexing includes information regarding an interleave pattern.

9. The communication device according to claim 1, wherein the information regarding the non-orthogonal multiplexing includes information regarding a scrambling pattern.

10. The communication device according to claim 1, wherein the information regarding the non-orthogonal multiplexing includes information regarding a spreading signal pattern.

11. The communication device according to claim 1, wherein the information regarding the non-orthogonal multiplexing includes information regarding a codebook.

12. The communication device according to claim 1, wherein the information regarding the non-orthogonal multiplexing includes information regarding a power level.

13. The communication device according to claim 1, wherein the predetermined resource pool is designated by the communication device, the first device, or a second device different from the communication device and the first device.

14. A communication device comprising:
circuitry configured to
receive from a first device broadcasted information regarding non-orthogonal multiplexing for grant-free transmission, wherein the information regarding non-orthogonal multiplexing comprises a notification of pattern vectors;
determine a set of the pattern vectors to be used for communications;
transmit a signal generated using the determined set of pattern vectors to the first device.

15. The communication device according to claim 14, wherein the circuitry is further configured to notify the first device of the information regarding the non-orthogonal multiplexing within a same unit frame time.

16. The communication device according to claim 14, wherein the circuitry is further configured to use other information regarding the non-orthogonal multiplexing when the used information regarding the non-orthogonal multiplexing is not usable.

17. The communication device according to claim 16, wherein the circuitry is further configured to notify the first device of the newly used information regarding the non-orthogonal multiplexing.

18. The communication device according to claim 14, wherein the information regarding the non-orthogonal multiplexing includes information regarding an interleave pattern.

19. The communication device according to claim 14, wherein the information regarding the non-orthogonal multiplexing includes information regarding a scrambling pattern.

20. The communication device according to claim 14, wherein the information regarding the non-orthogonal multiplexing includes information regarding a spreading signal pattern.

21. The communication device according to claim 14, wherein the information regarding the non-orthogonal multiplexing includes information regarding a codebook.

22. The communication device according to claim 14, wherein the information regarding the non-orthogonal multiplexing includes information regarding a power level.

23. A communication method comprising:
setting a predetermined resource pool to be used for grant-free transmission and information regarding non-orthogonal multiplexing in a first device, wherein the information regarding non-orthogonal multiplexing comprises a notification of pattern vectors;
periodically broadcasting the information regarding the non-orthogonal multiplexing; and
receiving a transmission from the first device comprising a second notification of a set of the pattern vectors to be used.

24. A communication method comprising:
receiving from a first device broadcasted information regarding non-orthogonal multiplexing for grant-free transmission, wherein the information regarding non-orthogonal multiplexing comprises a notification of pattern vectors;

determining a set of the pattern vectors to be used for communications;

transmitting a second notification of the determined set of the pattern vectors to be used; and transmitting a signal generated using the determined set of pattern vectors to the first device.

25. A non-transitory computer readable medium storing a computer program for causing a computer to:

set a predetermined resource pool to be used for grant-free transmission and information regarding non-orthogonal multiplexing in a first device, wherein the information regarding non-orthogonal multiplexing comprises a notification of pattern vectors;

periodically broadcast the information regarding the non-orthogonal multiplexing; and receive a transmission from the first device comprising a second notification of a set of the pattern vectors to be used.

26. A non-transitory computer readable medium storing a computer program for causing a computer to:

receive from a first device broadcasted information regarding non-orthogonal multiplexing for grant-free transmission, wherein the information regarding non-orthogonal multiplexing comprises a notification of pattern vectors;

determine a set of the pattern vectors to be used for communications;

transmit a second notification of the determined set of the pattern vectors to be used; and transmit a signal generated using the determined set of pattern vectors to the first device.

* * * * *